United States Patent
Kravitz et al.

(10) Patent No.: US 11,374,910 B2
(45) Date of Patent: *Jun. 28, 2022

(54) METHOD AND APPARATUS FOR EFFECTING A DATA-BASED ACTIVITY

(71) Applicant: Springcoin, Inc., Chicago, IL (US)

(72) Inventors: David William Kravitz, Chicago, IL (US); Mollie Johanna Zechlin, Los Angeles, CA (US); Matthew Benjamin Smith, Marina Del Rey, CA (US); Fabrice Cheng, Los Angeles, CA (US); John Sun, Northbrook, IL (US); Robert Zbigniew Krzyzanowski, Chicago, IL (US); Ashwini Rao, Pasadena, CA (US)

(73) Assignee: SPRINGCOIN, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,483

(22) Filed: Mar. 12, 2020

(65) Prior Publication Data

US 2020/0336470 A1 Oct. 22, 2020

Related U.S. Application Data

(60) Provisional application No. 62/988,760, filed on Mar. 12, 2020, provisional application No. 62/932,730, (Continued)

(51) Int. Cl.
*H04L 29/06* (2006.01)
*H04L 9/32* (2006.01)
*H04L 9/40* (2022.01)

(52) U.S. Cl.
CPC ........ *H04L 63/0428* (2013.01); *H04L 9/3234* (2013.01)

(58) Field of Classification Search
None
See application file for complete search history.

(56) References Cited

U.S. PATENT DOCUMENTS

| | | | |
|---|---|---|---|
| 4,200,770 | A | 4/1980 | Diffie |
| 4,567,600 | A | 1/1986 | Massey |

(Continued)

OTHER PUBLICATIONS

José L. Hernández-Ramos, Jorge Bernal Bernabe, M. Victoria Moreno and Antonio F. Skarmeta, "Preserving Smart Objects Privacy through Anonymous and Accountable Access Control for a M2M-Enabled Internet of Things", Jul. 1, 2015, Department of Information and Communications Engineering, pp. 15612-15639 (Year: 2015).*

(Continued)

*Primary Examiner* — Arezoo Sherkat
(74) *Attorney, Agent, or Firm* — Fitch, Even, Tabin & Flannery LLP

(57) ABSTRACT

A coordinating network element manages a protocol that prohibits the coordinating network element from substantively accessing data content that, at least in part, underlies received protocol-compliant requests. By one approach, these teachings provide for preventing substantive access to data information that is included within the protocol-compliant request in tokenized form, wherein the tokens are generated using secrets, at least one of which is unavailable to the coordinating network element.

20 Claims, 28 Drawing Sheets

Related U.S. Application Data filed on Nov. 8, 2019, provisional application No. 62/885,729, filed on Aug. 12, 2019, provisional application No. 62/821,021, filed on Mar. 20, 2019, provisional application No. 62/820,151, filed on Mar. 18, 2019, provisional application No. 62/818,014, filed on Mar. 13, 2019.

(56) References Cited

U.S. PATENT DOCUMENTS

| | | | |
|---|---|---|---|
| 2010/0082973 | A1 | 4/2010 | Brickell |
| 2012/0173663 | A1 | 7/2012 | Kammerer |
| 2012/0265984 | A1 | 10/2012 | Ramanujan |
| 2016/0366180 | A1 | 12/2016 | Smith |
| 2017/0251025 | A1 | 8/2017 | Varley |
| 2019/0013950 | A1 | 1/2019 | Becker |
| 2019/0305938 | A1* | 10/2019 | Sandberg-Maitland ............. H04L 9/321 |
| 2020/0052903 | A1 | 2/2020 | Lam |
| 2020/0067707 | A1* | 2/2020 | Resch ............. H04L 9/0869 |
| 2020/0082126 | A1* | 3/2020 | Brown ............. G06F 16/9535 |
| 2020/0126075 | A1* | 4/2020 | Fisch ............. G06Q 40/06 |
| 2020/0128022 | A1* | 4/2020 | Bleikertz ............. H04L 63/0421 |
| 2020/0153803 | A1* | 5/2020 | Treat ............. H04L 9/008 |
| 2020/0327252 | A1 | 10/2020 | McFall |
| 2020/0412542 | A1* | 12/2020 | Bartolucci ............. H04L 9/3066 |
| 2021/0152365 | A1* | 5/2021 | Nosseir ............. H04L 9/3239 |
| 2022/0029969 | A1 | 1/2022 | Kravitz |

OTHER PUBLICATIONS

Adi Shamir; How to Share a Secret; Programming Techniques; Nov. 1979, 2 pages.
Cryptography; Equality Checking Using Additive Homomorphic Encryption; Known of as early as 2016.
Federal Information Processign Standards Publication; FIPS PUB 186-5; Digital Signature Standard (DSS);Information Technology Laboratory; National Institute of Standards and Technology; Issued Jul. 2013, 10 Pages.
Pascal Paillier, Public-Key Cryptosystems Based on Composite Degree Residuosity Classes; GEMPLUS Cryptography Department; pp. 1-16; Copyright springer-Verlag Berlin Heidelberg 1999.
Recommendation for Pair-Wise Key-Establishment Schemes Using Discrete Logarithm Cryptography; Elaine Barker et al.; National Institute of Standards and Technology, NIST Special Publicaiton 800-56A, Revision 3, 19 pages; Apr. 2018.
Stephen C. Pohlig and Martin E. Hellman; An Improved Algorithm for Computing Logarithms Over GF(i) and Its Cryptographic Significance; IEEE Transactions on Information Theory, vol. IT-24, No. 1, Jan. 1978; pp. 1-5.
PCT Patent Application No. PCT/US2020/022625; International Search Report and Written Opinion; dated Jun. 15, 2020; 13 Pages.
Gayathri Garimella et al.; Private Set Operations from Oblivious Switching; Oregon Statement University; 27 pages; Mar. 1, 2021.
Mihaela Ion et al.; On Deploying Secure Computing: Private Intersection-Sum-With_Cardinality; pp. 1-25; https://eprint.iacr.org/2019/723; Sep. 7, 2020.
Paillier, Pascal (1999), "Public-Key Cryptosystems Based on Composite Degree Residuosity Classes," EUROCRYPT, Springer, pp. 223-238, doi:10.1007/3-540-48910-X_16.
Prasad Buddhavarapu et al.; Private Matching for Compute; pp. 1-20; https://eprint.iacr.org/2020/599; May 22, 2020.
Private Set Intersection, Using a Semi-Trusted Server, Cryptography Stack Exchange, Mar. 11, 2014, 2 pages [https://crypto.stackexchange.com/questions/14925/private-set-intersection-using-a-semi-trusted-server].

* cited by examiner

FIG. 6
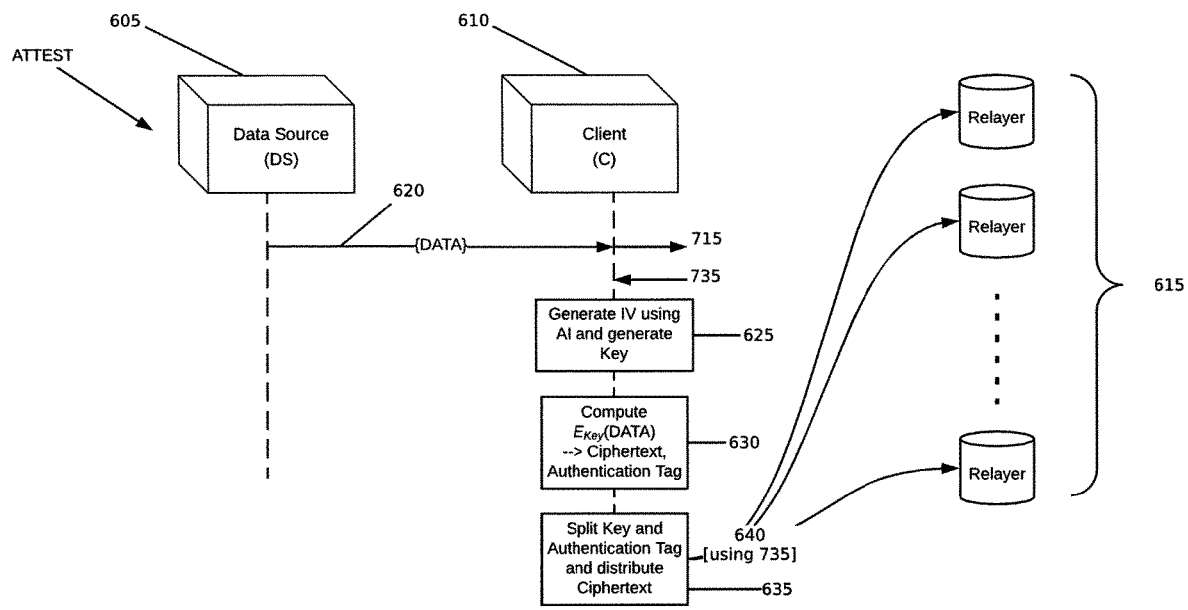
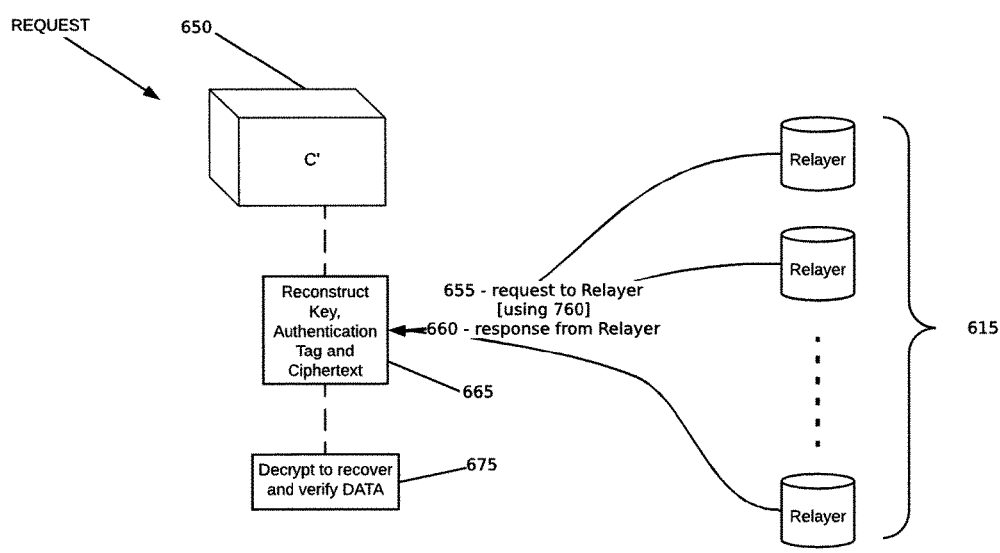

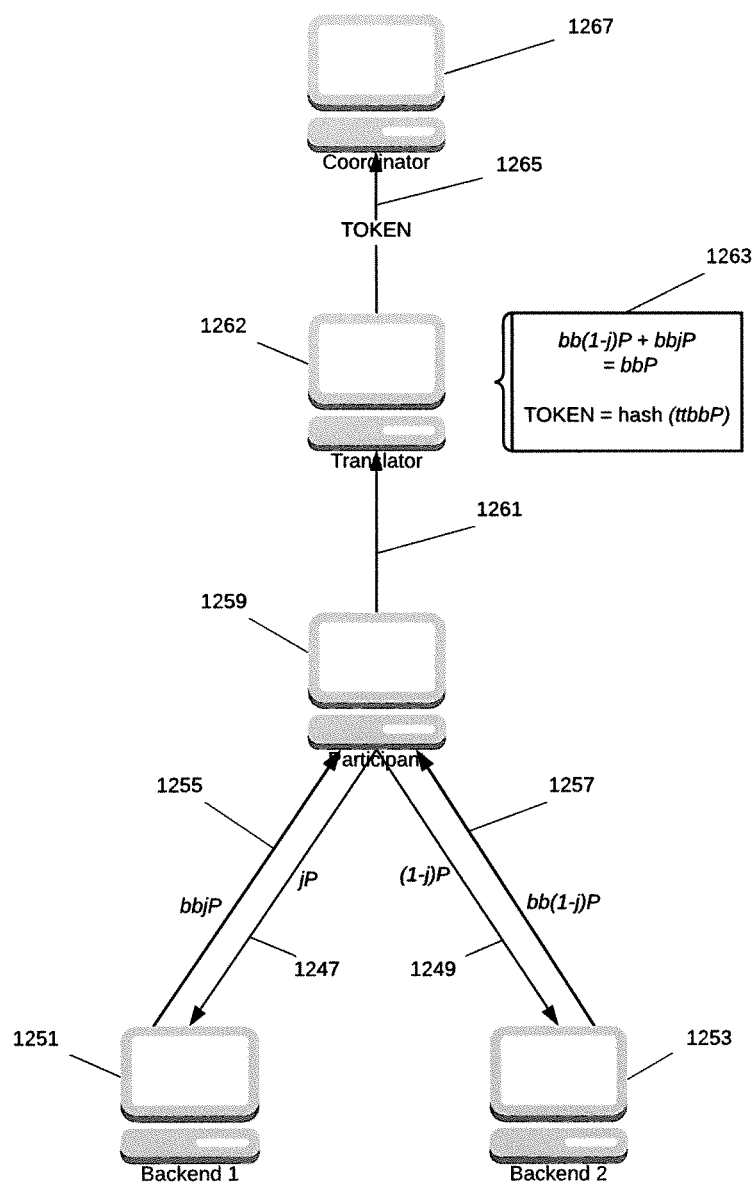

FIG. 16

| | Elliptic Curve Pohlig-Hellman Cipher | |
|---|---|---|
| | Alice and Bob previously agree on shared secret $l$ | |
| | Alice's Actions | Bob's Actions |
| [1610] | Encryption:<br>Chooses $P$<br>Computes and sends $Q = lP$ | |
| [1620] | | Decryption:<br>Computes $l^{-1}(lP) = P$ |

FIG. 17

| | Alice's Actions | Bob's Actions |
|---|---|---|
| | One-Way Elliptic Curve Pohlig-Hellman Cipher | |
| [1710] | Encryption:<br>Chooses $P$<br>Computes and sends $Q = kP$ | |
| [1720] | | Receives $Q$ and cannot find $P$ |

FIG. 18

| | Full Elliptic Curve Pohlig-Hellman Cipher Process | | |
|---|---|---|---|
| | Participant | Backend | Translator |
| [1810] | Pohlig-Hellman Encryption: Chooses $P$ Computes and sends $Q = lP$ | | |
| [1820] | | One-Way Pohlig-Hellman Encryption: Computes and sends $b(lP) = blP$ | |
| [1830] | Pohlig-Hellman Decryption: Computes and sends $l^{-1}(blP) = bP$ | | |
| [1840] | | | One-Way Pohlig-Hellman Encryption: Computes and sends $t(bP) = tbP$ |

FIG. 19

| | One-Pass Elliptic Curve Diffie-Hellman Key Exchange | |
|---|---|---|
| | System decides on Elliptic Curve and point $G$ | |
| | Alice's Actions | Bob's Actions |
| [1910] | | Chooses $n_B$<br>Computes $n_B G$ (static public key) |
| [1920] | Chooses $n_A$<br>Computes $n_A G$ (ephemeral public key)<br>Computes $n_A(n_B G)$ (shared secret) | |
| [1930] | | Computes $n_B(n_A G)$ (shared secret) |

FIG. 20

| Calculations to derive shared secret or EC Pohlig-Hellman ciphertext (2-partitioned case) ||||
|---|---|---|---|
| | Partition $i$ | 1 | 2 |
| [2010] | Partition $i$ owns | $x_1, r_1$ | $x_2, r_2$ |
| [2020] | Partition $i$ calculates $r_i Q$ and passes to partition $i + 1$ mod 2 | $r_1 Q$ | $r_2 Q$ |
| [2030] | Partition $i$ multiplies by $x_i$ and passes to partition $i + 1$ mod 2 | $x_1 r_2 Q$ | $x_2 r_1 Q$ |
| [2040] | Partition $i$ multiplies by $r_i^{-1} x_i$ mod $n$ | $r_1^{-1} x_1 x_2 r_1 Q$ | $r_2^{-1} x_2 x_1 r_2 Q$ |
| | Shared secret or Pohlig-Hellman ciphertext | $x_1 x_2 Q$ ||

FIG. 21

| Calculations to derive shared secret or EC Pohlig-Hellman ciphertext ($k$-partitioned case) | | | | | |
|---|---|---|---|---|---|
| | Partition $i$ | 1 | 2 | ... | $k$ |
| [2110] | Partition $i$ owns | $x_1, r_1$ | $x_2, r_2$ | ... | $x_k, r_k$ |
| [2120] | Partition $i$ calculates $r_i Q$ and passes to partition $i+1 \bmod k$ | $r_1 Q$ | $r_2 Q$ | ... | $r_k Q$ |
| [2130] | Partition $i$ multiplies by $x_i$ and passes to partition $i+1 \bmod k$ [via $k$-1 iterations] | $x_1 r_k Q$ $x_1 x_k r_{k-1} Q$ ... $x_1 x_k \cdots x_3 r_2 Q$ | $x_2 r_1 Q$ $x_2 x_1 r_k Q$ ... $x_2 x_1 \cdots x_4 r_3 Q$ | ... ... ... ... | $x_k r_{k-1} Q$ $x_k x_{k-1} r_{k-2} Q$ ... $x_k x_{k-1} \cdots x_2 r_1 Q$ |
| [2140] | Partition $i$ multiplies by $r_i^{-1} x_i \bmod n$ | $r_1^{-1} x_1 x_k \cdots x_2 r_1 Q$ | $r_2^{-1} x_2 x_1 \cdots x_3 r_2 Q$ | ... | $r_k^{-1} x_k x_{k-1} \cdots x_1 r_k Q$ |
| | Shared secret or Pohlig-Hellman ciphertext | $x_1 x_2 \cdots x_k Q$ | | | |

METHOD AND APPARATUS FOR EFFECTING A DATA-BASED ACTIVITY

RELATED APPLICATIONS

This application claims the benefit of U.S. Provisional application No. 62/818,014, filed Mar. 13, 2019, U.S. Provisional application No. 62/820,151, filed Mar. 18, 2019, U.S. Provisional application No. 62/821,021, filed Mar. 20, 2019, U.S. Provisional application No. 62/885,729, filed Aug. 12, 2019, U.S. Provisional application No. 62/932,730, filed Nov. 8, 2019, and U.S. Provisional application No. 62/988,760, filed Mar. 12, 2020, which are each incorporated by reference in their entirety herein.

TECHNCIAL FIELD

These teachings relate generally to accessing data and more particularly to the preservation of privacy.

BACKGROUND

Modern data communications systems are adept at quickly and reliably transporting information of various kinds. In some cases this also includes providing for the secure transport of such information using, for example, encryption techniques to encrypt the en-route information.

In many cases, the foregoing provision of information includes information that identifies either the original source of the information or the immediate source of the information. Knowing who the source is can be important in some cases to having corresponding trust in the veracity of the information itself. There are times, however, when the source may wish to remain unknown to the recipient. While the prior art can provide for hiding identity information, such approaches tend to achieve that result at the expense of trust in the received information for lack of a basis to trust the source.

Accordingly, current data communications technology presents a conundrum; how to both protect identity information while at the same time assuring the recipient of the veracity of the information source?

BRIEF DESCRIPTION OF THE DRAWINGS

The above needs are at least partially met through provision of the method and apparatus for effecting a data-based activity described in the following detailed description, particularly when studied in conjunction with the drawings, wherein:

FIG. 6 comprises a flow diagram as configured in accordance with various embodiments of these teachings and that illustrates attesting and requesting to enable data transport, including communication with Relayers for deposit as part of Attestation activity and retrieval as part of Request activity. The transmissions depicted in FIG. 6 may include an overlay, such as encryption that is subsequently decrypted, that is not explicitly shown;

FIG. 12(a) involves bidirectional cascaded processing by two Backends, each of which utilizes a secret value that is distinct from the other and from that of a follow-on Translator. FIG. 12(b) involves unidirectional cascaded processing by two Backends, each of which utilizes a secret value that is distinct from the other and from that of a follow-on Translator. FIG. 12(c) involves solely independent processing by two Backends which utilize the same secret value that is distinct from that of a follow-on Translator. The transmissions depicted in FIG. 12(*a*), FIG. 12(*b*) and FIG. 12(*c*) may include an overlay, such as encryption that is subsequently decrypted, that is not explicitly shown;

FIG. 16 comprises a flow diagram as configured in accordance with various embodiments of these teachings and that illustrates communication and processing of an instance of the Elliptic Curve Pohlig-Hellman Cipher operation;

FIG. 17 comprises a flow diagram as configured in accordance with various embodiments of these teachings and that illustrates communication and processing of an instance of the One-Way Elliptic Curve Pohlig-Hellman Cipher operation;

FIG. 18 comprises a flow diagram as configured in accordance with various embodiments of these teachings and that illustrates communication and processing of an instance of the Full Elliptic Curve Pohlig-Hellman Cipher Process;

FIG. 19 comprises a flow diagram as configured in accordance with various embodiments of these teachings and that illustrates communication and processing of an instance of the One-Pass Elliptic Curve Diffie-Hellman Key Exchange;

FIG. 20 comprises a flow diagram as configured in accordance with various embodiments of these teachings and that illustrates communication and processing by a 2-partitioned processor of an instance of Elliptic Curve Pohlig-Hellman or the recipient side of a One-Pass Elliptic Curve Diffie-Hellman;

FIG. 21 comprises a flow diagram as configured in accordance with various embodiments of these teachings and that illustrates communication and processing by a k-partitioned processor of an instance of Elliptic Curve Pohlig-Hellman or the recipient side of a One-Pass Elliptic Curve Diffie Hellman;

FIG. 22 depicts generation of the private keys, public keys, and internal (i.e., processor partition communicating with its counterpart processor partition) hash-based message authentication code (HMAC) keys. This figure also similarly represents the key generation for the Translator processor type;

Figure 1:
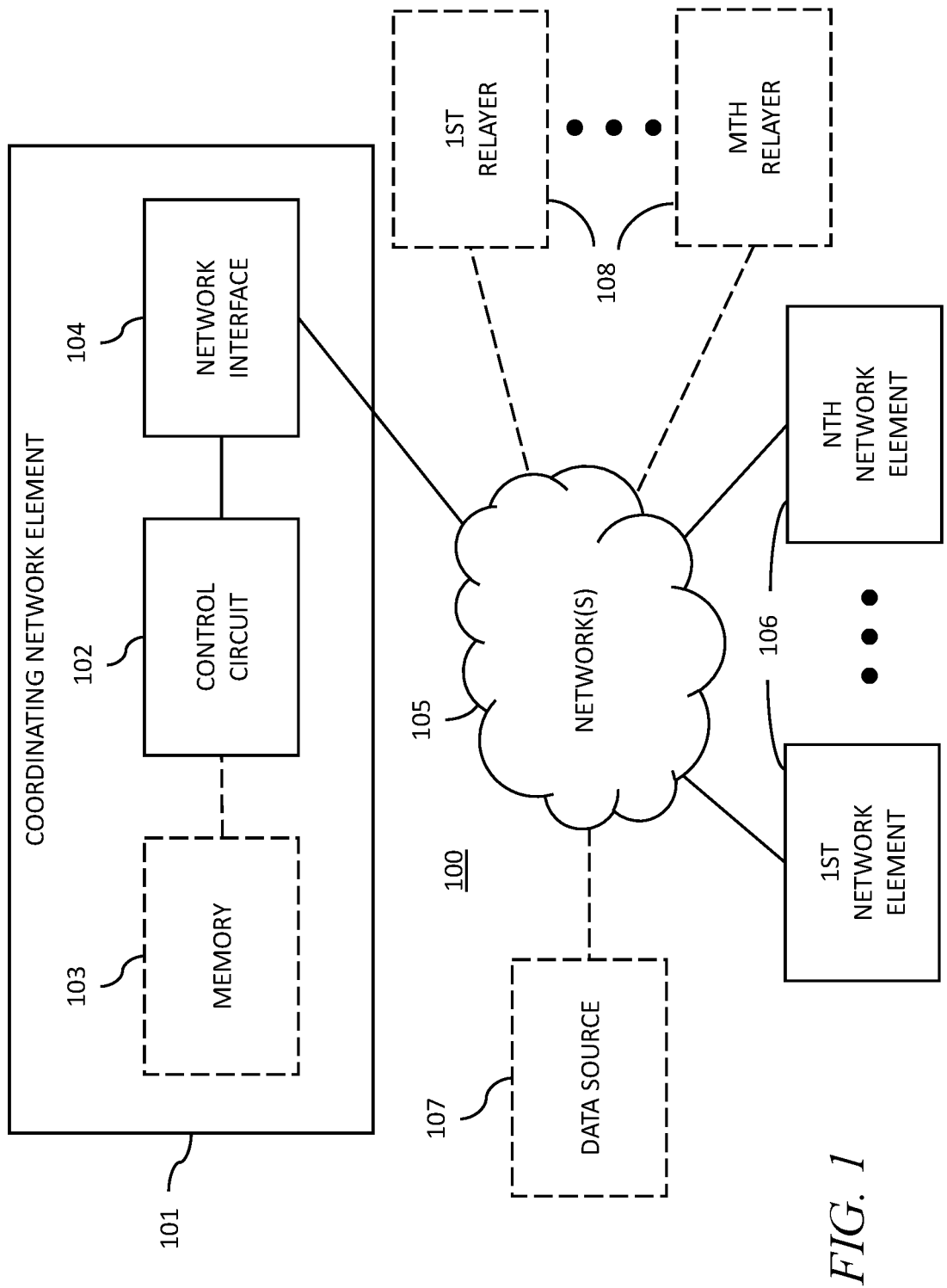
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

Generally speaking, pursuant to these various embodiments a coordinating network element manages a protocol that prohibits the coordinating network element from substantively accessing data content that, at least in part, underlies received protocol-compliant requests. By one approach, these teachings provide for preventing substantive access to data information that is included within the protocol-compliant request in tokenized form, wherein the tokens are generated using secrets, at least one of which is unavailable to the coordinating network element.

Such protocol-compliant requests can be received from, for example, a requesting network element that comprises a network element acting within an attestor role or from a requesting network element that serves as a secondary network element acting within a requestor role. The protocol-compliant request itself can pertain to data information comprising, for example, at least one of referenced data content, a referenced data type, a referenced initial data source, and data information associated with an initial data source.

By one approach, when the requesting network element is a network element acting within the aforementioned attestor role, these teachings provide for facilitating, at least in part and via the aforementioned protocol, authorizing the requesting network element to make asynchronously available for data-based processing data that is sourced via the requesting network element. When the data is sourced as indirect data the sourcing can entail derivation from data received by the requesting network element from an initial data source. In such a case an identity of the secondary network element can be blinded from the requesting network element to thereby preserve privacy in those regards.

By one approach the aforementioned authorizing can comprise, at least in part, generating verifiable permissions that advise relayers that the requesting network element acting within the attestor role is authorized to store content in relayer-accessible storage where the content comprises at least one of cryptographic parameters, data, and metadata instrumental to enabling at least one of transference and corroboration of data. By one approach the aforementioned storing of the content in the relayer-accessible storage comprises storing parts of the content in at least one of plaintext form and encrypted form.

The content itself can comprise stored values that may serve, for example, as a decryption token and/or cryptographic parameters and metadata. Such decryption tokens can serve to represent at least one of the ciphertext and cryptographic parameters generated by the requesting network element when acting within the attestor role. The aforementioned cryptographic parameters and metadata can be applied together with data to configure comparison tokens. In this case, a determination can be made regarding whether there is a match of comparison tokens that represent candidate data processed using the stored values against comparison tokens that represent a result of processing data that is contributed by the requesting network element acting within the attestor role.

The aforementioned determination can be configured so that determination cannot falsely be made by the requesting network element acting within the requestor role where there is a match of comparison tokens because of a faulty response received by the requesting network element acting within the requestor role, i.e., false positives can be averted. The aforementioned determination can furthermore utilize encryption supporting additive- and scalar multiplicative-homomorphism with a public key supplied by the requesting network element acting within the requestor role that is applied by the requesting network element acting within the requestor role to a function of comparison tokens generated by the requesting network element acting within the requestor role and that is applied by the coordinating network element to comparison tokens received by the coordinating network element from requesting network elements acting within the attestor role when responding to the requesting network element acting within the requestor role.

By another approach, in lieu of the foregoing or in combination therewith, the aforementioned content can comprise a collection of shares such that a threshold number of such shares enables reconstruction of the content. By one approach these shares are distributed across a plurality of relayers by the requesting network element acting within the attestor role.

By one approach, the aforementioned data-based processing can comprise one or more of transference of attested-to data content and corroboration of data content against previously attested-to data content. The aforementioned corroboration of data content can comprise, in turn, and at least in part, sourcing data from a requesting network element that is acting within the requestor role, wherein when the data is sourced as indirect data the sourcing entails derivation from data received by the requesting network element from an initial data source. When the requesting network element acting within the requestor role uses data sourced as indirect data, an identity of the referenced initial data source and any tokens derived from data information associated with the initial data source can be rendered substantively inaccessible to other network elements capable of acting within a requestor role or attestor role.

By another approach, and again in lieu of the foregoing or in combination therewith, when the requesting network element is a secondary network element that is acting within the requestor role, these teachings provide for facilitating, at least in part and via the aforementioned protocol, authorization of the secondary network element to process data previously sourced from another requesting network element. In this case, these teachings can provide for blinding the identity of the another requesting network element from the secondary network element to thereby protect the privacy of the former. The aforementioned authorizing can include authorizing revocation on behalf of a requesting network element of one or more previous attestations with which that requesting network element was involved as acting within the attestor role, so as to, in particular, have the effect of removing them from consideration as part of the aforementioned authorization of the secondary network element to process data.

By one approach, the aforementioned authorization can comprise, at least in part, the generation of verifiable permissions that advise at least one relayer that the requesting network element acting within the requestor role is authorized to retrieve from relayer-accessible storage, in plaintext or encrypted form, content comprising at least one of cryptographic parameters, data, and metadata.

With regard to preventing substantive access to data information that is included within the protocol-compliant request in tokenized form, wherein the tokens are generated using secrets at least one of which is unavailable to the coordinating network element, by another approach, and again in lieu of the foregoing or in combination therewith, secrets can be held disjointly at a plurality of processors of distinct types, wherein at least one processor of each type is involved in token generation. Preferably, at least one processor type is not controlled or substantively accessible by the coordinating network element. Each of these secrets used collectively to generate tokens can be independently generated by each of a plurality of processors of distinct types or distributed during setup across a plurality of processors covering the relevant processor types, wherein the latter mechanism is consistent with establishing multiple replicas of processors of each type so as to enable load balancing and operational recovery.

One use case is the tokenization of data information associated with an initial data source wherein requests for the generation of tokens are initiated by a requesting network element that is supplied with data by the aforementioned initial data source. Such tokens can be used to enable the coordinating network element to look up information concerning previous attestations completed by network elements acting within the attestor role when responding to a network element acting within the requestor role, where such tokens are incorporated as data information associated with an initial data source. In some instances, such tokens may serve as references to initial data sources.

Another use case is the tokenization of data content for the purpose of referencing data content for corroboration. In such use case, authorizing a requesting network element acting within the attestor role entails, at least in part, acceptance by the coordinating network element of tokens submitted by the requesting network element or by a proxy as representative of data content. Such proxy may be a processor involved in the generation of the tokens. Further, in such use case, authorizing a requesting network element acting within the requestor role entails, at least in part, acceptance by the coordinating network element of tokens submitted by the requesting network element acting within the requestor role or by a proxy as representative of data content against which the coordinating network element compares values of tokens it holds that were previously accepted as submitted by requesting network elements acting within the attestor role. Such proxy may be a processor involved in the generation of the tokens.

Further, regarding tokenization of data information associated with an initial data source wherein requests for generation of tokens are initiated by a requesting network element that is supplied with data by the aforementioned initial data source, as a prerequisite to or while already acting within an attestor role or requestor role, a requesting network element can successively request token generation action by a first processor of a first processor type or a combination of sub-processors designated collectively as a first processor of a first processor type and then by a separately addressable second processor of a second processor type or a combination of sub-processors designated collectively as a second processor of a second processor type such that data information within a request made to the first processor is blinded from the first processor by the requesting network element's introduction of a blinding factor. Further, action taken by the first processor based on collective access to a first secret can serve to blind the data information from the second processor even after the requesting network element removes its previously introduced blinding factor from the result of action by the first processor prior to requesting action be taken by the second processor based on collective access to a second secret that can result in a token value that is blinded from substantive access by the requesting network element. The first secret and second secret can be updated to a new first secret and a new second secret without negating the usefulness of previously generated tokens, wherein a preferably randomly generated modifier or multiplier is applied by the first processor to the first secret and an appropriately computed inverse of the modifier or multiplier is applied by the second processor to the second secret. With regard to the first processor and the second processor considered independently of each other, where the first processor is comprised of a combination of two or more sub-processors, these sub-processors of the first processor can each update their held component or components of the first secret that is collectively accessible by the first processor without modifying that first secret. Similarly with regard to the first processor and the second processor considered independently of each other, where the second processor is comprised of a combination of two or more sub-processors, these sub-processors of the second processor can each update their held component or components of the second secret that is collectively accessible by the second processor without modifying that second secret.

Further, regarding tokenization of data content for the purpose of referencing data content for corroboration and in order to achieve appropriate blinding, the token generation method can be designed so that given access to a set of token values and to contributions of processors towards generation of the token values, it is computationally infeasible to distinguish which contributions of each of the processors map to which token values within the set even if given access to all of the processor secrets used collectively to generate the tokens.

So configured, these teachings provide a solid basis for permitting a provision of information (and/or the corroboration of information) via an approach that can both protect the identity of one or more of the information sources while nevertheless reassuring the information recipient regarding that source. These teachings will therefore be understood to comprise an improvement over typically-available data communications technology. It will further be appreciated that these teachings and their corresponding benefits can be applied in a wide variety of different application settings. Some relevant examples include, but are not limited to, the provision of medical services and the corresponding use of medical records, pharmaceutical processing and dispensation, location and/or condition-specific monitoring (including, for example, the monitoring of ambient and/or environmental conditions as well as disease-related indicia), cross-platform and/or cross-agency/branch exchanges of security-related data including counter-terrorism activities, economic/financial-related purposes including but not limited to credit and loan processing, fraud detection, and so forth. In such regards the skilled person will further appreciate the ready ability of these teachings to accommodate use in an application setting that includes any of a variety of so-called Internet-of-Things devices and services.

These and other benefits may become clearer upon making a thorough review and study of the following detailed description. Referring now to the drawings, and in particular to FIG. 1, an illustrative apparatus 100 that is compatible with many of these teachings will now be presented.

In this particular example, the enabling apparatus 100 includes a coordinating network element 101. This coordinating network element is configured to effect a data-based activity via a corresponding network 105. As will be described in more detail herein, this coordinating network element 101 manages a protocol that prohibits the coordinating network element 101 from substantively accessing data content that, at least in part, underlies received protocol-compliant requests.

In this illustrative example the coordinating network element 101 includes a control circuit 102. Being a "circuit," the control circuit 102 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 102 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 102 is configured (for example, by using corresponding programming as will be well understood by those skilled in the art) to carry out one or more of the steps, actions, and/or functions described herein.

By one optional approach the control circuit 102 operably couples to a memory 103. This memory 103 may be integral to the control circuit 102 or can be physically discrete (in whole or in part) from the control circuit 102 as desired. This memory 103 can also be local with respect to the control circuit 102 (where, for example, both share a common circuit board, chassis, power supply, and/or housing) or can be partially or wholly remote with respect to the control circuit 102 (where, for example, the memory 103 is physically located in another facility, metropolitan area, or even country as compared to the control circuit 102).

In addition to storing other information as described herein, this memory 103 can serve, for example, to non-transitorily store the computer instructions that, when executed by the control circuit 102, cause the control circuit 102 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

In this example the control circuit 102 also operably couples to a network interface 104. So configured the control circuit 102 can communicate with other elements (both within the apparatus 100 and external thereto) via the network interface 104. More particularly, the network interface 104 facilitates compatible communications via one or more networks 105. Numerous examples are known in the art. A non-exhaustive listing would include Universal Serial Bus (USB)-based interfaces, RS232-based interfaces, I.E.E.E. 1394 (aka Firewire)-based interfaces, Ethernet-based interfaces, any of a variety of so-called Wi-Fi™-based wireless interfaces, Bluetooth™-based wireless interfaces, cellular telephony-based wireless interfaces, Near Field Communications (NFC)-based wireless interfaces, standard telephone landline-based interfaces, cable modem-based interfaces, and digital subscriber line (DSL)-based interfaces. Such interfaces can be selectively employed to communicatively couple the control circuit 102 to another network element, to a local area network, or to any of a variety of wide area networks or extranets (such as, but not limited to, the Internet).

Relevant to the following description, so configured, the coordinating network element 101 can compatibly communicate via the aforementioned protocol with any of a plurality of network elements 106 (illustrated in FIG. 1 as a first network element through an Nth network element). As will be described in more detail below, such network elements 106 may be acting within a so-called attestor role or as a secondary network element that is acting within a so-called requestor role.

Other apparatuses that may play a part in effecting the data-based activity in a given application setting include such elements as a data source 107 that does not act as either an attestor or a requestor and/or one or more so-called relayers 108.

Figure 2:
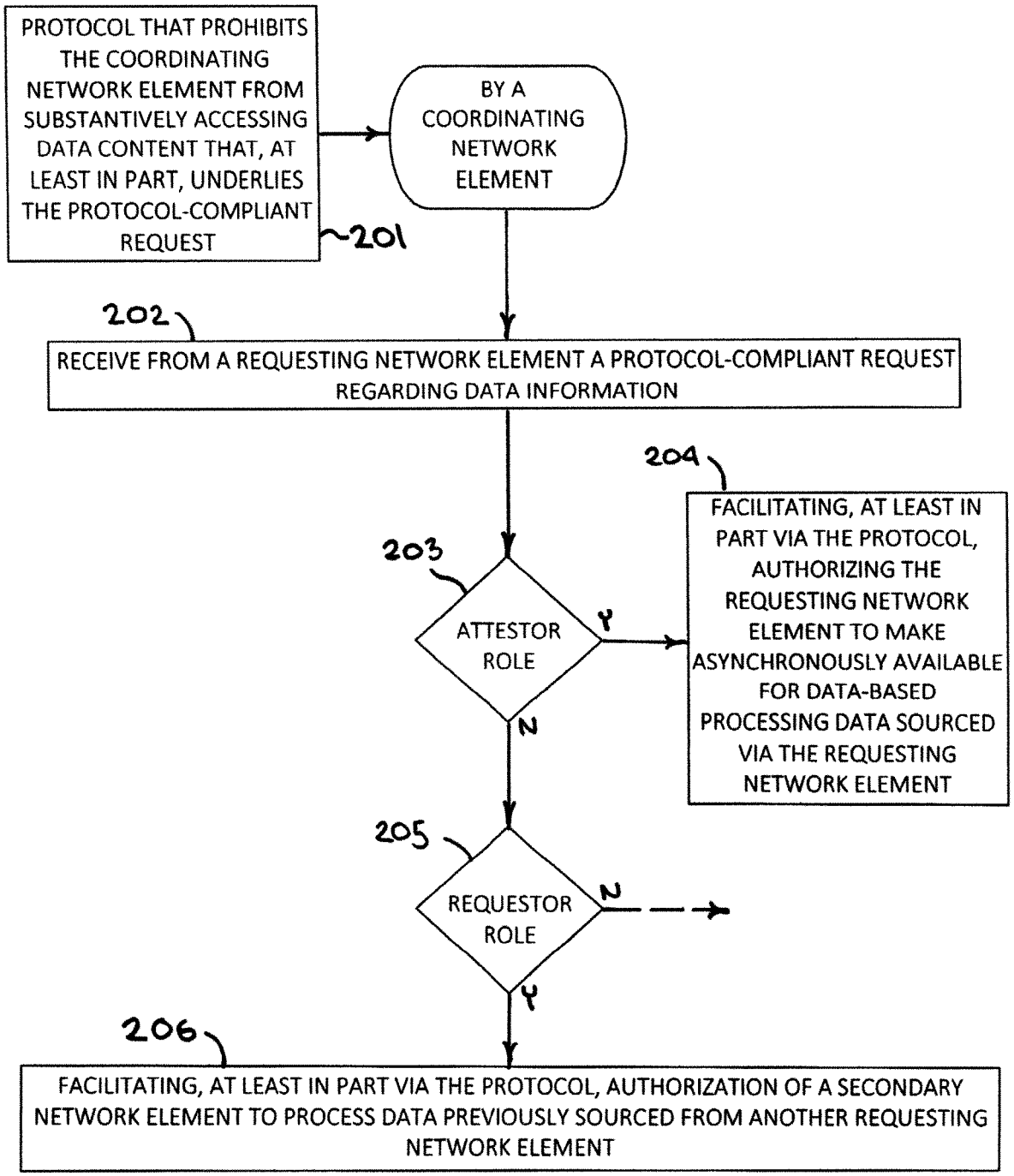
FIG. 2 comprises a flow diagram as configured in accordance with various embodiments of these teachings.

Referring now to FIG. 2, the aforementioned coordinating network element 101 will be presumed to carry out the illustrated process 200 for the sake of an illustrative example. By one approach, the above-described control circuit 102 carries out the described actions, activities, and functions. Also as described above, the coordinating network element 101 will carry out this process 200 while managing a protocol 201 that, amongst other things, prohibits the coordinating network element 101 from substantively accessing data content that, at least in part, underlies the protocol-compliant requests described herein.

At block 202, the coordinating network element 101 receives, via the aforementioned network 105, a protocol-compliant request regarding data information. This protocol-compliant request may be contained within a single discrete message or may, if desired, comprise a plurality of discrete messages. This protocol-compliant request is received from a requesting network element 106 that is either acting within an attestor role or as a secondary network element that is acting within a requestor role. The data information that corresponds to the protocol-compliant request can constitute or comprise any of a variety of data items. Examples include, but are not limited to, referenced data content, referenced data type, a reference to initial data source, and data information associated with an initial data source 107.

At block 203 the coordinating network element 101 determines whether the requesting network element 106 is a network element that is acting within an attestor role. When true, at block 204 the coordinating network element 101 facilitates, at least in part via the aforementioned protocol, authorizing the requesting network element 106 to make asynchronously available for data-based processing data sourced via the requesting network element. In this example the data is sourced as indirect data and entails derivation from data received by the requesting network element from an initial data source 107.

Importantly, and per the aforementioned protocol, the identity of a corresponding secondary network element that acts within a requestor role in these regards is blinded from the requesting network element.

At block 206 authorization of a secondary requesting network element acting within a requestor role to process data previously sourced from another requesting network element can comprise, at least in part, the generation of verifiable permissions that advise at least one relayer 108 that the requesting network element acting within the requestor role is authorized to retrieve from relayer-accessible storage, in plaintext or encrypted form, content comprising at least one of cryptographic parameters, data, and metadata.

The aforementioned authorizing at block 204 of the requesting network element to make asynchronously available for data-based processing the data sourced via the requesting network element acting within an attestor role can comprise, at least in part, generating verifiable permissions that advise relayers 108 that the requesting network element acting within the attestor role is authorized to store content in relayer-accessible storage comprising at least one of cryptographic parameters, data, and metadata instrumental to enabling at least one of transference and corroboration of data. (These teachings will accommodate storing the aforementioned content in the relayer-accessible storage by storing at least parts of the content in at least one of plaintext form and encrypted form.)

By one approach, the aforementioned content comprises stored values that are configured to serve as at least one of decryption tokens and at least one of cryptographic parameters and/or metadata. The aforementioned decryption tokens can, by one approach, represent at least one of ciphertext and cryptographic parameters generated by the requesting network element acting within the attestor role. It may be noted that, per these teachings, the coordinating network element 101 is prohibited from and therefore cannot substantively access data information that is included within the protocol-compliant request in tokenized form, where decryption tokens are generated using secrets at least one of which is unavailable to the coordinating network element 101. For example, such unavailability may be due to the substantive inaccessibility by the coordinating network element 101 to the storage of one or more relayers 108.

The aforementioned cryptographic parameters and metadata, in turn, can be applied together with data to configure comparison tokens such that a determination can be made regarding whether there is a match of comparison tokens representing candidate data processed using the stored values against comparison tokens representing a result of processing data contributed by the requesting network element acting within the attestor role. It may be noted that, per these teachings, the coordinating network element 101 is prohibited from and therefore cannot substantively access data information that is included within the protocol-compliant request in tokenized form, where comparison tokens are generated using secrets at least one of which is unavailable to the coordinating network element 101. For example, such unavailability may be due to the substantive inaccessibility by the coordinating network element 101 to the storage of one or more relayers 108.

By one approach, the aforementioned content can comprise a collection of shares such that a threshold number of such shares enables reconstruction of the content. By one approach these shares are distributed across a plurality of relayers 108 by the requesting network element acting within the attestor role.

As noted above, the coordinating network element 101 can authorize the requesting network element acting within an attestor role to make asynchronously available for data-based processing data sourced via the requesting network element. By one approach, that data-based processing can comprise at least one of a transference of attested-to data content and corroboration of data content against previously attested-to data content. That corroboration of data content against previously attested-to data content, in turn, can comprise, at least in part, sourcing data from a requesting network element that is acting within the requestor role, wherein when the data is sourced as indirect data the sourcing entails derivation from data received by the requesting network element from an initial data source 107.

When the determination made at block 203 is false, at block 205 the coordinating network element 101 determines whether the requesting network element is a secondary network element that is acting within the requestor role. When such is not the case, this process 200 can accommodate any of a variety of responses as desired. As one example in these regards, this process 200 will accommodate returning to the beginning of this process 200 to thereby process another subsequently received protocol-compliant request.

When true, at block 206 this process 200 provides for facilitating, at least in part via the aforementioned protocol, authorization of the secondary network element to process data previously sourced from another requesting network element. This authorization can comprise, at least in part, the generation of verifiable permissions that advise at least one relayer 108 that the requesting network element acting within the requestor role is authorized to retrieve from relayer-accessible storage, in plaintext or encrypted form as appropriate, content comprising at least one of cryptographic parameters, data, and metadata.

Importantly, and again, an identity of the another requesting network element is blinded from the secondary network element.

So configured, requests from various entities regarding a variety of data types can be shared and/or attested to without necessarily disclosing the identities of the various entities engaged in these activities. This blinding includes the coordinating network element 101 that facilitates such sharing of information.

Various exemplary application settings and implementation details will now be presented. It shall be understood that the specific details provided in these descriptions are intended to serve an illustrative purpose and should not be taken as limiting examples that constrain the application of these teachings.

Figure 3:
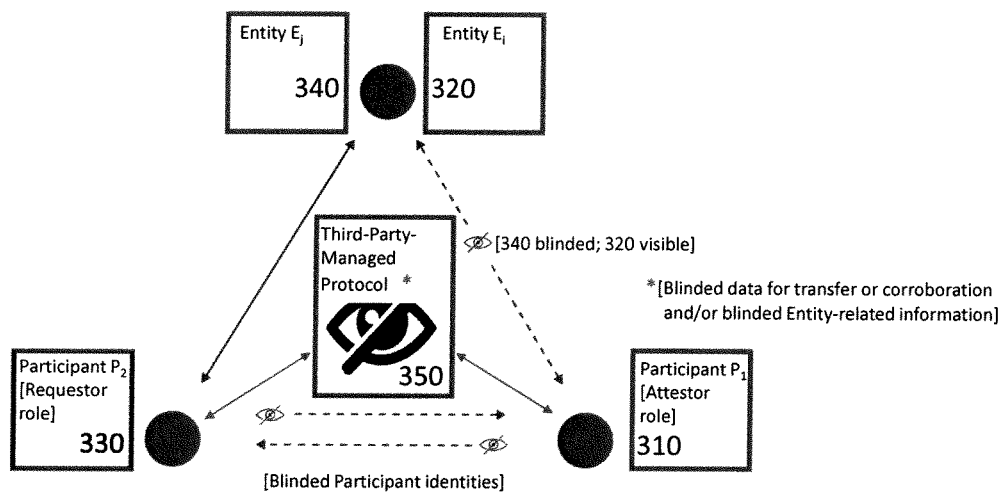
FIG. 3 comprises a block diagram as configured in accordance with various embodiments of these teachings and that illustrates an overview of blinded information/data exchange or corroboration between Participants via a third-party-managed protocol, involving Participants as Attestors or Requestors.

Referring now to FIG. 3, a Participant $P_1$ 310 acquires data sourced from an Entity $E_i$ 320 and acting within an Attestor role utilizes a third-party-managed protocol 350 in order to provide the system with an Attestation of data derived from such source data. Such derivation may involve normalization of source data. Such Attestation may involve a datatype. Such Attestation may involve a representation of information associated with or related to the Entity $E_i$ 320 which may comprise information identifying the Entity $E_i$ 320 such as Social Security Number and Date of Birth. Such representation may be in the form of blinded Entity-related information that is thus opaque to the protocol 350 and thus to a Server or Servers that run the protocol 350. Such representation may be used, possibly along with datatype, as a mechanism of categorizing the source data. The Server or Servers that run the protocol 350 may be distributed in their administration/ownership across multiple parties or companies. The efficacy of blinding from access by the protocol 350 may thus be dependent on practical limits on collusion or compromise activity.

In certain use cases, such as a fraud attributes registry, Attestations do not bear blinded or unblinded Entity-related information. That may be because such Attestations are used to enable a Requestor to attempt to corroborate or match data across all Entities that have sourced data to Participants of the system that have subsequently attested to such data. Such Entities may be fraudulent or impostors. Such data may be partially or wholly synthetic or may involve combinations of legitimate and falsified or misappropriated data, or such data or such Entity may be suspected by an attesting Participant of being fraudulent or otherwise improper.

The data that is made available for transfer or corroboration via a posted Attestation may be represented in the form of blinded data that is thus opaque to the protocol 350. A Participant $P_2$ 330 acting within a Requestor role utilizes the protocol 350 in order to receive a transfer of data that has been attested to or to attempt to corroborate data derived from data that the Participant $P_2$ 330 has acquired from the Entity $E_j$ 340. Such Attestation may involve a datatype. Such Attestation may involve a representation of information associated with or related to the Entity $E_k$ 340, where such representation may be blinded. Preferably, the requesting Participant $P_2$ 330 and the attesting Participant $P_1$ 310 do not become aware of each other's true or even their pseudonymous identity. Preferably, the Participant $P_1$ 310 does not become aware of the Entity $E_j$ 340 at least prior to some potentially system-enforced delay, even if the Entity $E_j$ 340 is the same as the Entity $E_i$ 320. Such delay may be measured, for example, in time or periodicity or transaction volume.

Figure 4:
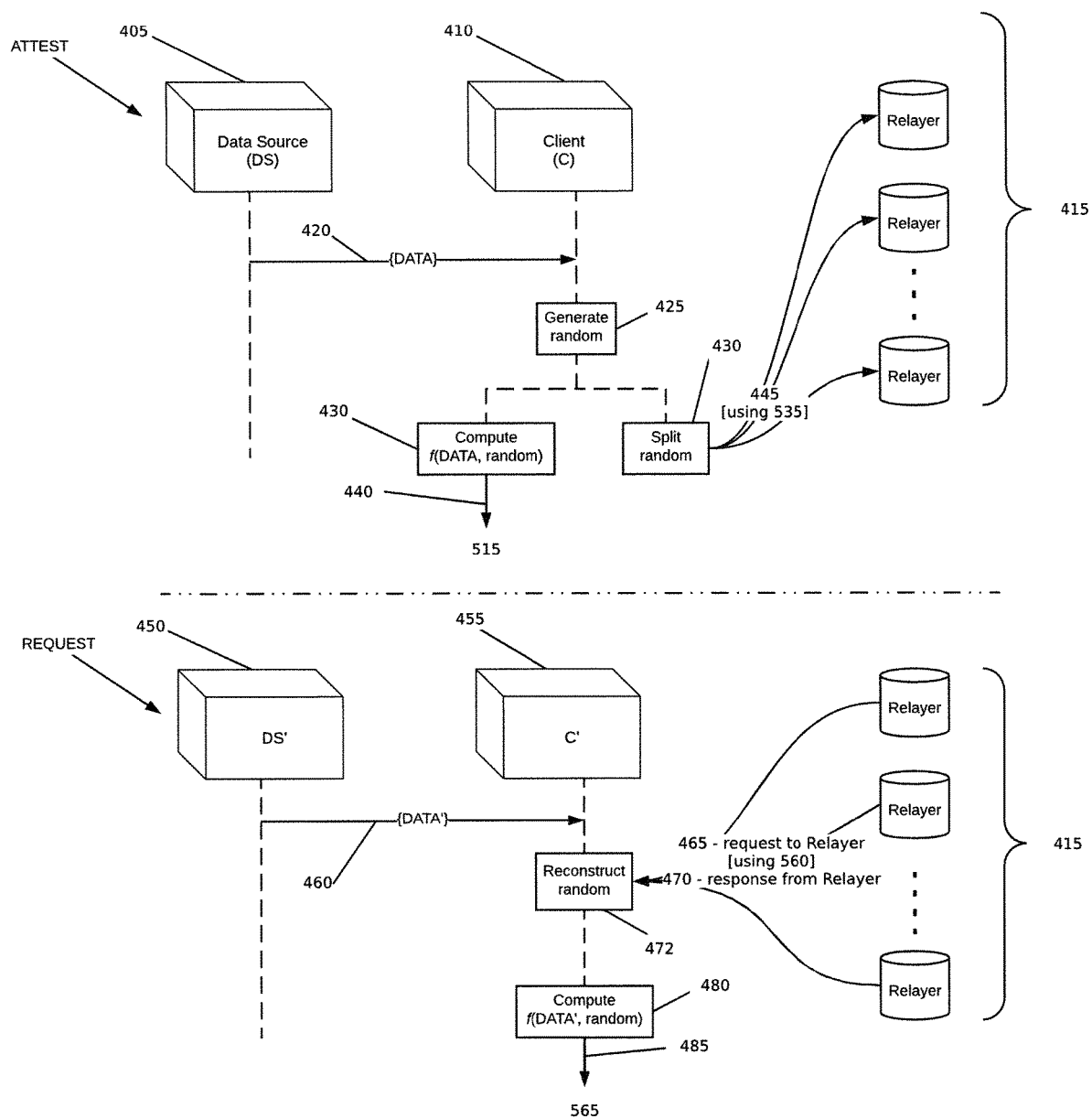
FIG. 4 comprises a flow diagram as configured in accordance with various embodiments of these teachings and that illustrates attesting and requesting to enable corroboration, including communication with Relayers for deposit as part of Attestation activity and retrieval as part of Request activity. The transmissions depicted in FIG. 4 may include an overlay, such as encryption that is subsequently decrypted, that is not explicitly shown.
Figure 5:
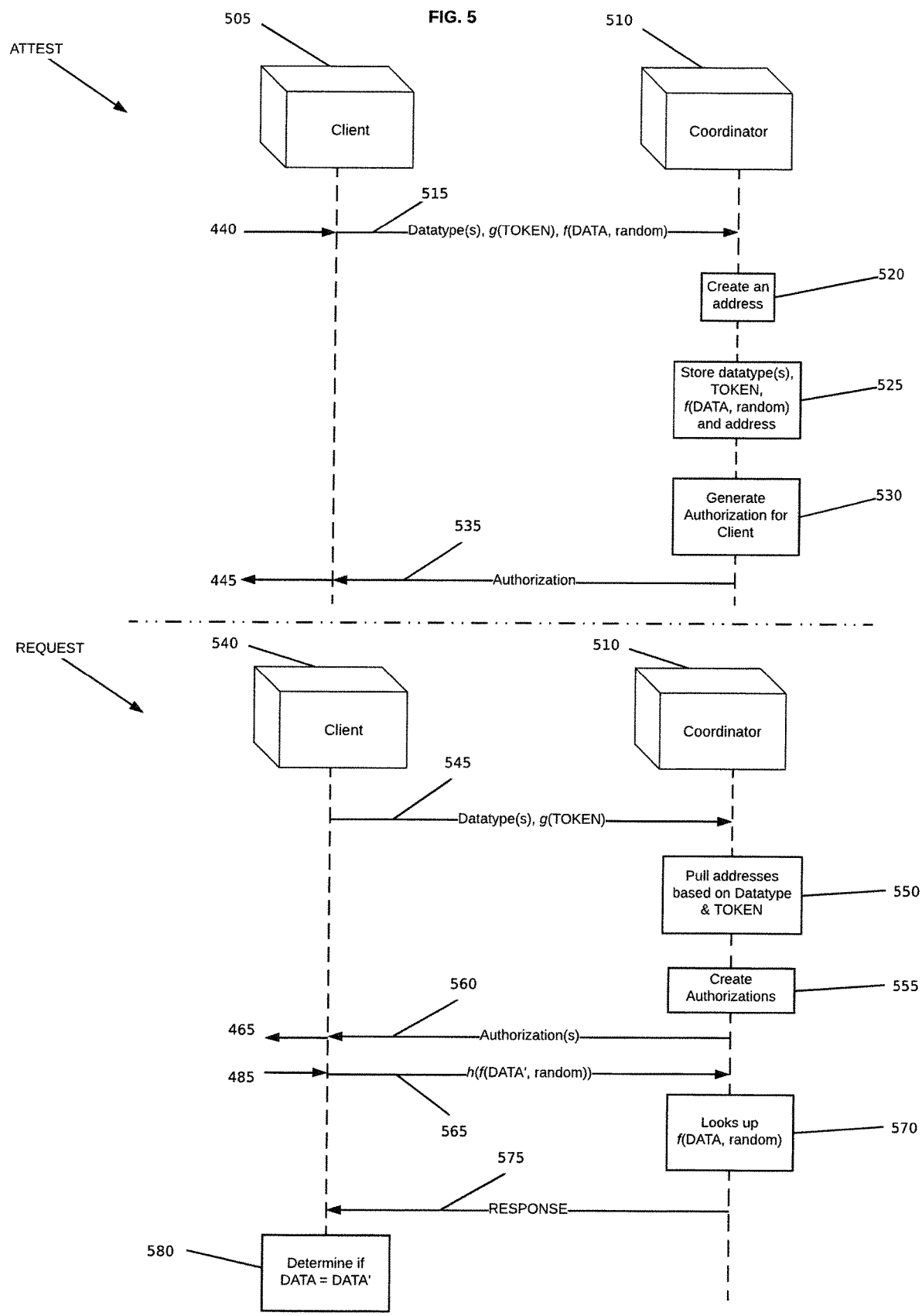
FIG. 5 comprises a flow diagram as configured in accordance with various embodiments of these teachings and that illustrates Coordinator-provided Authorizations to Participant Clients for use with Relayers in FIG. 4. The transmissions depicted in FIG. 5 may include an overlay, such as encryption that is subsequently decrypted, that is not explicitly shown.

Referring now to FIG. 4, and also referring as needed to FIG. 5, at the top half is shown an Attestation action sequence involving a Client 410 (C) as a computer, software and/or hardware operated by a Participant or on behalf of one or more Participants (e.g., as a Client gateway to one or more Servers running a third-party-managed protocol). At the bottom half is shown a Request action sequence involving a Client 455 (C') as a computer, software and/or hardware operated by a Participant or on behalf of one or more Participants (e.g., as a Client gateway to one or more Servers running a third-party-managed protocol). The set of Relayers 415 are common across Attestations and Requests against Attestations. Data or information deposit to Relayer storage or retrieval from Relayer storage may entail communications involving the Client 410 or the Client 455, respectively, across a multiplicity of Relayers 415.

Attest: A Data Source 405 provides a set of DATA 420 to the Client 410. The Client 410 randomly or pseudorandomly generates a value, denoted as random, at 425, splits it at 430, possibly along with other parameters such as metadata, and transmits the resultant splits to the Relayers 415. As a prerequisite for each involved Relayer to accept split(s) sent to it, such Relayer may require an appropriate Authorization as made available to the Client 410 at 535 of FIG. 5. At 430, the Client 410 computes a function $f$ of DATA and random, where random denotes the preferably randomly or pseudo-randomly generated value generated at 425. As an example, DATA may be concatenated with random and then a one-way hash function may be applied to the result. As another example, random may be used as an HMAC key applying the HMAC function to DATA as an argument. Other keyed hash functions may be used in place of HMAC. The function $f$ may integrate a normalization function that is applied to DATA. Such normalization may be useful in order to avoid false negatives when trying to corroborate or match data via Requests against Attestations. The function $f$ may incorporate arguments in addition to DATA and random, such as metadata. The result of the computation at 430 is transmitted as 440 to form at least part of the transmission 515 of FIG. 5 to the Coordinator 510 of FIG. 5.

Request: A Data Source 450 provides a set of DATA' 460 to the Client 455. At 465, the Client 455 requests splits of random from the Relayers 415. There may be a plurality of values of random corresponding to the same values of datatype and TOKEN, one value of random per Attestation corresponding to that datatype value and TOKEN value, across relevant Attestations previously posted by attesting Participants. The DATA element incorporated into each Attestation may or may not match one another. As a prerequisite for each involved Relayer to supply split(s) that were previously stored via Attestation(s), such Relayer may require an appropriate Authorization as made available to the Client 455 at 560 of FIG. 5. Upon successful authorization, each involved Relayer transmits a response 470 to the Client 455. The Client 455 reconstructs random(s), possibly along with other parameters such as metadata, at 472. At 480, the Client 455 computes the same function $f$ of DATA' value(s) and value(s) of random as that which was presumably applied during Attestation. f may, in particular, involve normalization of DATA' values. There may be additional arguments off such as metadata. The result(s) of 480 are transmitted in some form 485, which may involve application of some function h, to a Coordinator 510 via 565 of FIG. 5. A threshold scheme, e.g., a Shamir Secret Sharing scheme, may be used for the splitting of random at 430. As an example, a 3 out of 4 scheme can be used, where any 3 of the four shards enable reconstruction of random at 472.

Referring now to FIG. 5:

Attest: The Client 505 transmits, at 515, datatypes, g(TOKEN) and $f$(Data, random) to the Coordinator 510, where $f$(Data, random) was transmitted at 440 of FIG. 4. g(TOKEN) may correspond to a form of TOKEN that was previously supplied to the Participant Client 505. As an example, a Translator may have uniquely encrypted TOKEN using a key held in common with the Coordinator 510 and using a one-time-use Initialization Vector, resulting in Ciphertext and possibly an Authentication Tag that was delivered along with the Initialization Vector to the Client 505 or a delegate of the Client 505. 515 may additionally include a function of random that is ultimately posted to a blockchain and that can be retrieved and verified by a Participant Client 540 in its Request role against reconstructed random of 472 of FIG. 4. Such function may include additional arguments, such as metadata. Such function may involve a one-way hash function. The Coordinator 510 creates an address at 520 for use in management of its database. At 525, the Coordinator 510 stores datatype(s), TOKEN, $f$(DATA, random) and address or some form or function of these. The processing of 525 may include inverting or removing the effect of the function gas previously applied to TOKEN. At 530, the Coordinator 510 generates one or more Authorizations as transmitted to the Client 505 at 535. Such Authorization(s) are transmitted at 445 of FIG. 4 from the attesting Client denoted in FIG. 4 as 410 to one or more Relayers 415.

Request: The Client 540 transmits, at 545, datatypes and g(TOKEN) to the Coordinator 510. g(TOKEN) may correspond to a form of TOKEN that was previously supplied to the Participant Client 540. As an example, a Translator may have uniquely encrypted TOKEN using a key held in common with Coordinator 510 and using a one-time-use Initialization Vector, resulting in Ciphertext and possibly an Authentication Tag that was delivered along with the Initialization Vector to the Client 540 or a delegate of the Client 540. At 550, the Coordinator 510 pulls one or more addresses based on datatype and TOKEN. The processing of 550 may include inverting or removing the effect of the function gas previously applied to TOKEN. At 555, the Coordinator 510 creates Authorizations. Dependent on how splits of random were distributed to the Relayers 415 by attesting Clients at 445 of FIG. 4, there may be a plurality of Authorizations for each Attestation being tested by the requesting Client 540 where each such Authorization is intended for use with at least one of the Relayers 415 at request 465 of FIG. 4. These Authorizations are transmitted to the Client 540 at 560. The sequence 465, 470, 472, and 480 of FIG. 4 results in construction of $f$(DATA', random), which may be further processed to generate h($f$(DATA', random)) as depicted at reference numeral 485 of FIG. 4 and transmitted at 565 to the Coordinator 510. The specifics of function h may depend on the specifics of the sub-protocol comprised of the processing by the Coordinator 510 that results in RESPONSE of 575 and processing by the Client 540 at 580 that determines the corroboration status of DATA' against DATA. If 515 includes a function of random and possibly additional arguments such as metadata that is ultimately posted to a blockchain, it can be retrieved and verified by Client 540 against reconstructed random of 472 of FIG. 4.

Referring now to FIG. 6:

Attest: The Data Source 605 provides a set of DATA 620 to the Client 610, with one or more elements of such set transmitted to the Coordinator at 715 of FIG. 7 resulting in Authorization and Authorization Identifier, AI, of 735 made available to the Client 610 so that an Initialization Vector IV can be generated using the Attestation Identifier, AI, at 625 and split Key and Authentication Tag and distributed Ciphertext of 635 can be provided to the Relayers 615 at 640. Processing of 630 results in Ciphertext for confidentiality possibly as well as Authentication Tag for data integrity. The encryption of DATA using Key, as denoted by $E_{KEY}(DATA)$, may include the encryption of metadata as well as DATA.

Request: At 655, the Client 650 requests cryptographic material components comprised of split Key and Authentication Tag and distributed Ciphertext chunks from the Relayers 615. There may be a plurality of these corresponding to the same values of datatype and TOKEN, one per Attestation corresponding to that datatype value and TOKEN value, across relevant Attestations previously posted by attesting Participants. The plaintext DATA element incorporated under encryption into each Attestation may or may not match one another. As a prerequisite for each involved Relayer to supply cryptographic material that was previously stored via Attestation(s), such Relayer may require an appropriate Authorization as made available to the Client 650 at 760 of FIG. 7. Upon successful authorization, each involved Relayer transmits a response 660 to the Client 650. The Client 650 reconstructs the cryptographic material at 665, as subsequently used to recover and verify DATA at 675. A threshold scheme, e.g., a Shamir Secret Sharing scheme, may be used for the splitting of Key and Authentication Tag at 635. As an example, a 3 out of 4 scheme can be used, where any 3 of the four shards enable reconstruction of Key and Authentication Tag at 665.

Figure 7:
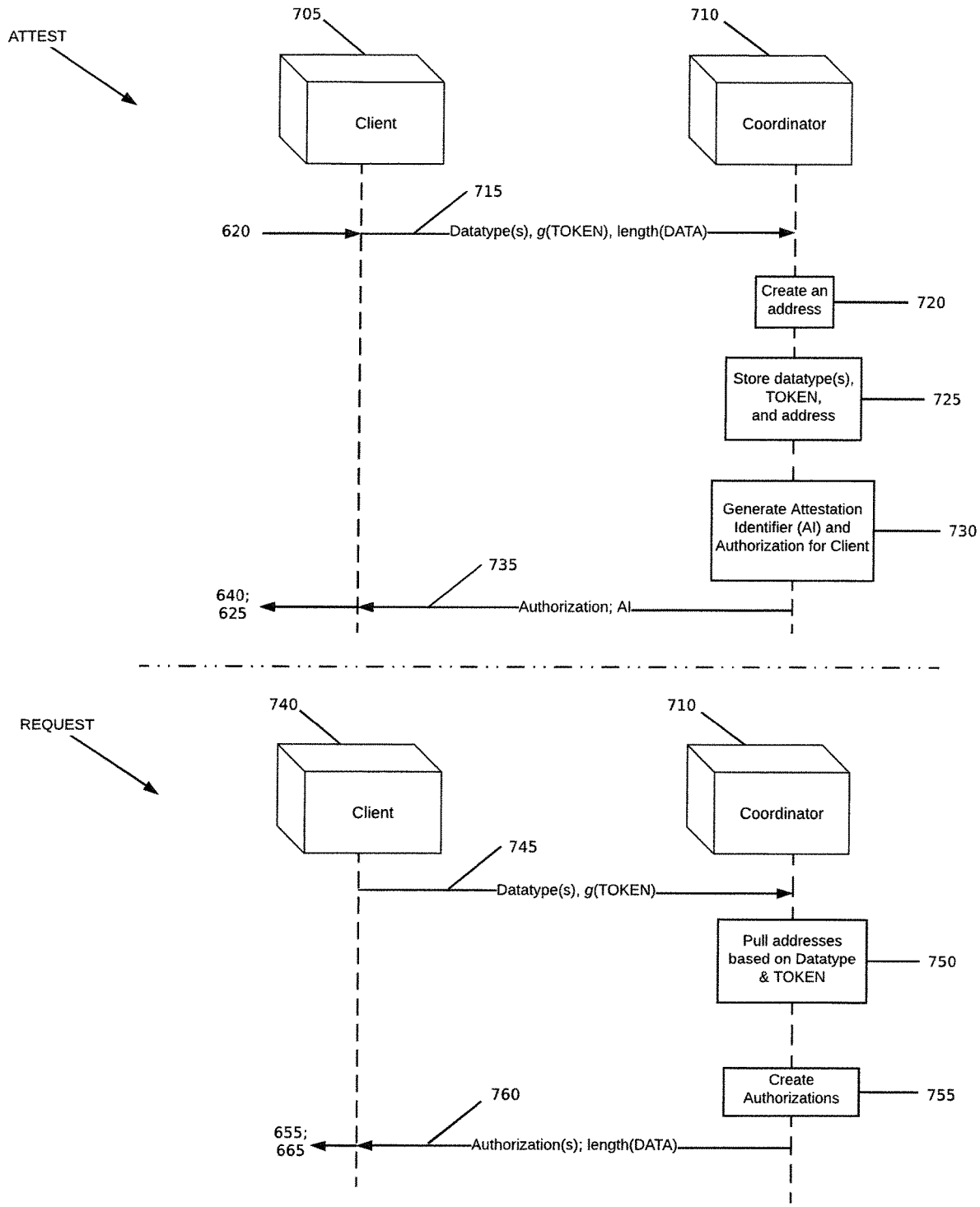
FIG. 7 comprises a flow diagram as configured in accordance with various embodiments of the invention and that illustrates Coordinator-provided Authorizations to Participant Clients for use with Relayers in FIG. 6. The transmissions depicted in FIG. 7 may include an overlay, such as encryption that is subsequently decrypted, that is not explicitly shown.

Referring now to FIG. 7:

Attest: The Client 705 transmits, at 715, datatypes, g(TOKEN) and length(DATA) to the Coordinator 710, where a set of DATA elements was received by the Client via 620 of FIG. 6. g(TOKEN) may correspond to a form of TOKEN that was previously supplied to the Participant Client 705. As an example, a Translator may have uniquely encrypted TOKEN using a key held in common with Coordinator 710 and using a one-time-use Initialization Vector, resulting in Ciphertext and possibly an Authentication Tag that was delivered along with the Initialization Vector to the Client 705 or a delegate of Client 705. The Coordinator 710 creates an address at 720 for use in management of its database. At 725, the Coordinator 710 stores datatype(s), TOKEN and address or some form or function of these. The processing of 725 may include inverting or removing the effect of the function g as previously applied to TOKEN. At 730, the Coordinator 710 generates one or more Authorizations as transmitted to the Client 705 at 735. Such Authorization(s) are transmitted at 640 of FIG. 6 from the attesting Client denoted in FIG. 6 as 610 to one or more of the Relayers 615.

Request: The Client 740 transmits, at 745, datatypes and g(TOKEN) to the Coordinator 710. g(TOKEN) may correspond to a form of TOKEN that was previously supplied to the Participant Client 740. As an example, a Translator may have uniquely encrypted TOKEN using a key held in common with the Coordinator 710 and using a one-time-use Initialization Vector, resulting in Ciphertext and possibly an Authentication Tag that was delivered along with the Initialization Vector to Client 740 or a delegate of Client 740. At 750, the Coordinator 710 pulls one or more addresses based on datatype and TOKEN. The processing of 750 may include inverting or removing the effect of the function gas previously applied to TOKEN. At 755, the Coordinator 710 creates Authorizations. Dependent on how cryptographic material components were distributed to the Relayers 615 by attesting Clients at 640 of FIG. 6, there may be a plurality of Authorizations for each Attestation being received by the requesting Client 740 where each such Authorization is intended for use with at least one of the Relayers 615 at request 655 of FIG. 6. These Authorizations are transmitted to the Client 740 at 760. The Attestation Identifiers (AI) may be posted to a blockchain. The requesting Client 740 may in that case retrieve AI from that blockchain in order to generate IV that is needed to perform operation 675 of FIG. 6. Alternatively, or additionally, AI may be transmitted at 760. Length(DATA) at 715 and 760 is a potentially optional field. In the case that Ciphertext includes padding that is appended by the attesting Client 610 to the result of $E_{Key}$(DATA), e.g., to even out the lengths of chunks of Ciphertext that are distributed to Relayers at 640 of FIG. 6, such padding must be removed by the requesting Client 650 at 665 of FIG. 6 prior to decryption at 675 of FIG. 6. Using length(DATA) received at 760 of FIG. 7, the requesting Client can determine which portion of Ciphertext, as reconstructed from what is received at 660 of FIG. 6, to use as input to decryption at 675 of FIG. 6. If, at 630 of FIG. 6, encryption is applied to additional fields beyond DATA, such as metadata, then that must be taken into account, e.g., by utilizing length(DATA ||metadata) instead of length (DATA) where || indicates concatenation.

Consider next, desired properties of a full-fledged solution to the use case wherein a $1^{st}$ Participant tests a data value purportedly associated with a specific Entity such as a phone number of said Entity for corroboration, i.e., in order to determine whether a $2^{nd}$ Participant considers that same data value to be associated with said specific Entity, where testing entails bidirectional communications with a Server:

1. Phishing resistance: 1st Participant learns only whether there is a match of submitted data value against data value of 2nd Participant;

2. Server obliviousness: Server cannot feasibly determine whether the submitted data value underlying the 1st Participant's query matches the data value of 2nd Participant unless and until 1st Participant sends optional follow-on communication;

3. False positive prevention: 1st Participant is unlikely to receive a false positive indication of a match whether the Server acts legitimately or not, to the extent that the space of possible legitimate submissions by 1st Participant that encapsulate a data value prior to encryption is large enough to be unlikely to guess against;

4. Privacy of submitted data value: An eavesdropper of communications between 1st Participant and Server cannot feasibly determine the data value of the 1st Participant;

5. Privacy of 2nd Participant data value: An eavesdropper of communications between 1st Participant and Server cannot feasibly determine the data value of the 2nd Participant.

Optional Follow-On Communication:

Preferably using either a symmetric encryption function or a public key encryption function for which Server possesses the private key and 1st Participant has knowledge of a corresponding public key, 1st Participant communicates to Server the variables needed to enable the Server to duplicate the query previously sent by the 1st Participant. This is one way to enable the Server to determine whether the data value previously sent by the 1st Participant matches the data value of 2nd Participant. Preferably 1st Participant cannot feasibly determine a second data value that would result in the same query.

Note that within a scenario such that it is considered sufficient to satisfy only property 1, that is achievable by having the Server S simply respond in the affirmative or negative to a query of a first Participant P, dependent on whether the data value encapsulated within the query matches or does not match, respectively, the data value encapsulation associated with 2nd Participant.

The protocol allows a first Participant P to verify that a data value that it holds matches that held by a particular second Participant, as measured by comparing an encapsulation of the data value P holds to an encapsulation of a data value stored on or accessible to a Server S. In the case of sensitive information, it is desirable to minimize exposure to unencrypted plaintext representations of such encapsulations. Therefore, the protocol restricts the capability to recover such plaintext to intended recipient Participant P. Furthermore, the protocol inhibits a malicious Participant P from accessing a non-malicious Server S's encapsulated data value that reflects a data value that is distinct from that submitted by Participant P within its query. This is achieved by performing probabilistic or non-deterministic homomorphic operations on such encapsulation. Furthermore, there are occasions upon which P might be willing to undertake a potentially risky action on the basis that positive corroboration of P's information is considered to reduce the risk of such action or to aid in remediation of possibly adverse effects of undertaking such action. It is therefore considered advantageous that the protocol prevents Server S from successfully manipulating its behavior so as to simulate a match in response to a query based on a data value that does not actually match that within an encapsulation associated with the particular second Participant. The protocol is thus resistant to perpetration of responses that represent false positives.

As references to an example of encryption/decryption scheme (Epk, Dsk) that supports additive— as well as scalar multiplicative— homomorphism: Paillier, Pascal (1999), "Public-Key Cryptosystems Based on Composite Degree Residuosity Classes," EUROCRYPT, Springer, pp. 223-238, doi:10.1007/3-540-48910-X_16; https://crypto.stackexchange.com/questions/36998/equality-checking-using-additive-homorphic-encryption (all of which are fully incorporated herein by this reference).

Figure 8:
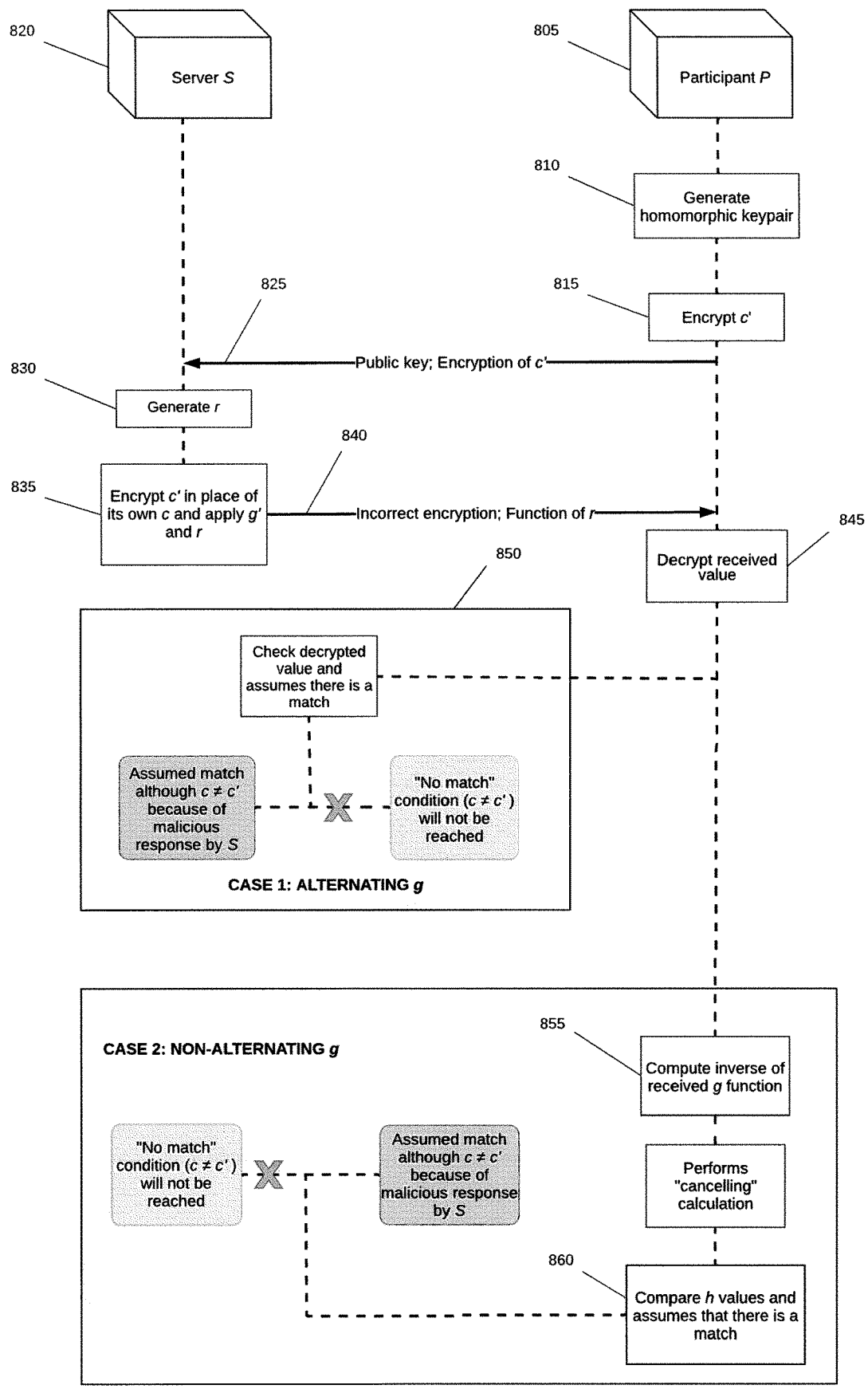
FIG. 8 comprises a flow diagram as configured in accordance with various embodiments of these teachings and that illustrates a "False-Positive-Prone Protocol" in which a server S exploits an inadequacy of that version of the data corroboration protocol in order to deliver a "false positive," or false indication of a match, to a well-behaved Participant P. The transmissions depicted in FIG. 8 may include an overlay, such as encryption that is subsequently decrypted, that is not explicitly shown.

Referring now to FIG. 8 on "False-Positive-Prone Protocol," the Participant P 805 generates a public/secret keypair (pk, sk) at 810 for some encryption/decryption scheme ($E_{pk}$, $D_{sk}$) that supports additive- as well as scalar multiplicative— homomorphism defined as follows (as enabled, e.g., by utilizing Pascal Paillier's scheme): Additive homomorphism–there exists an operation+' such that $D_{sk}[E_{pk}(x)+'E_{pk}(y)]=x+y$, where + is addition as defined in the group of plaintexts, and scalar multiplicative homomorphism – there exists an operation *' such that $D_{sk}[x*'E_{pk}(y)]=x*y$, where * is multiplication as defined in the group of plaintexts. Note that a function is denoted here as hom-computable if it can be evaluated using only +' and *'. The Participant P 805 encrypts c' at 815, P's query against data value encapsulation c held by Server S 820, where c' and c denote the encapsulation of P's and S's data values, respectively. P 805 delivers pk and $E_{pk}(c)$ to the Server S 820 at 825, and the secret key sk is kept private. S 820 generates r at 830, which is preferably an integer chosen uniformly at random from an appropriately large set. Typically, S 820 encrypts its data value encapsulation c and computes r *'g'($E_{pk}(c)$, $E_{pk}(c)$) at 835, where, g' is a hom-computable function known to both S 820 and P 805, and *' is the preimage of scalar multiplication on plaintexts under $D_{sk}$. As examples of g': g'(x, y)=x-'y, where -' is analogous to the inverse of homomorphic addition, and g'(x, y)=x+'y, where +' is defined as above. However, FIG. 8 represents the case where S acts maliciously and therefore uses the received $E_{pk}(c')$ in place of its own c. S 820 sends r*' g'($E_{pk}(c')$, $E_{pk}(c')$) to P 805 at 840. If the function g, or the image of g' under $D_{sk}$ in the space of plaintexts, does not have the alternating property (where the alternating property is defined as g(x, x)=0, for all x), then proceed. Otherwise, skip the following function h application. S 820 sends h(r) at 840, or alternatively h(r||c'), to P 805, where h is a one-way function efficiently computable by both S and P, preferably one that maps data of an arbitrary size or bit-length to data of a fixed size or bit-length (e.g., a cryptographic hash function). Examples of h: h(x)= $H_{SHA-256}(x)$, and h(x)=$HMAC_{SHA-256}$(key, x), where key is a secret shared between P 805 and S 820 and SHA-256 is as specified in NIST FIPS-PUB 180-4 (Secure Hash Standard). P 805 computes $D_{sk}[r *' g'(E_{pk}(c'), E_{pk}(c'))]=r*g(c', c')$ at 845, where g is defined as the image of g' under $D_{sk}$ in the space of plaintexts. If g has the alternating property defined as g(x, x)=0, for all x, proceed to 850. Otherwise, continue to 855. P 805 verifies that the result from 845 is equal to 0 at 850. Since S has acted maliciously, c≠c', however P 810 assumes c=c'. Typically, P 805 then computes $(g[c, c'])^{-1}$ at 855 and proceeds to calculate r'=r*g(c, c')*$(g[c, c'])^{-1}$. Clearly, if c'=c, then r'=r. Otherwise, P 805 will compute a random value not equal to r. However, since S 820 has acted maliciously, they will get a false positive and assume r'=r. P 805 verifies that the h(r) (or alternatively h(r||c), depending on choice of implementation) delivered in 840 matches h applied to the value computed in 855 (potentially concatenated with c') at 860. If so, then c=c', if S 820 had behaved as expected. Otherwise, c≠c', if S has behaved as expected. However, since S acted maliciously, P will again receive a false-positive and assume there was a match. If g does not have the alternating property defined in 840, end here.

Figure 9:
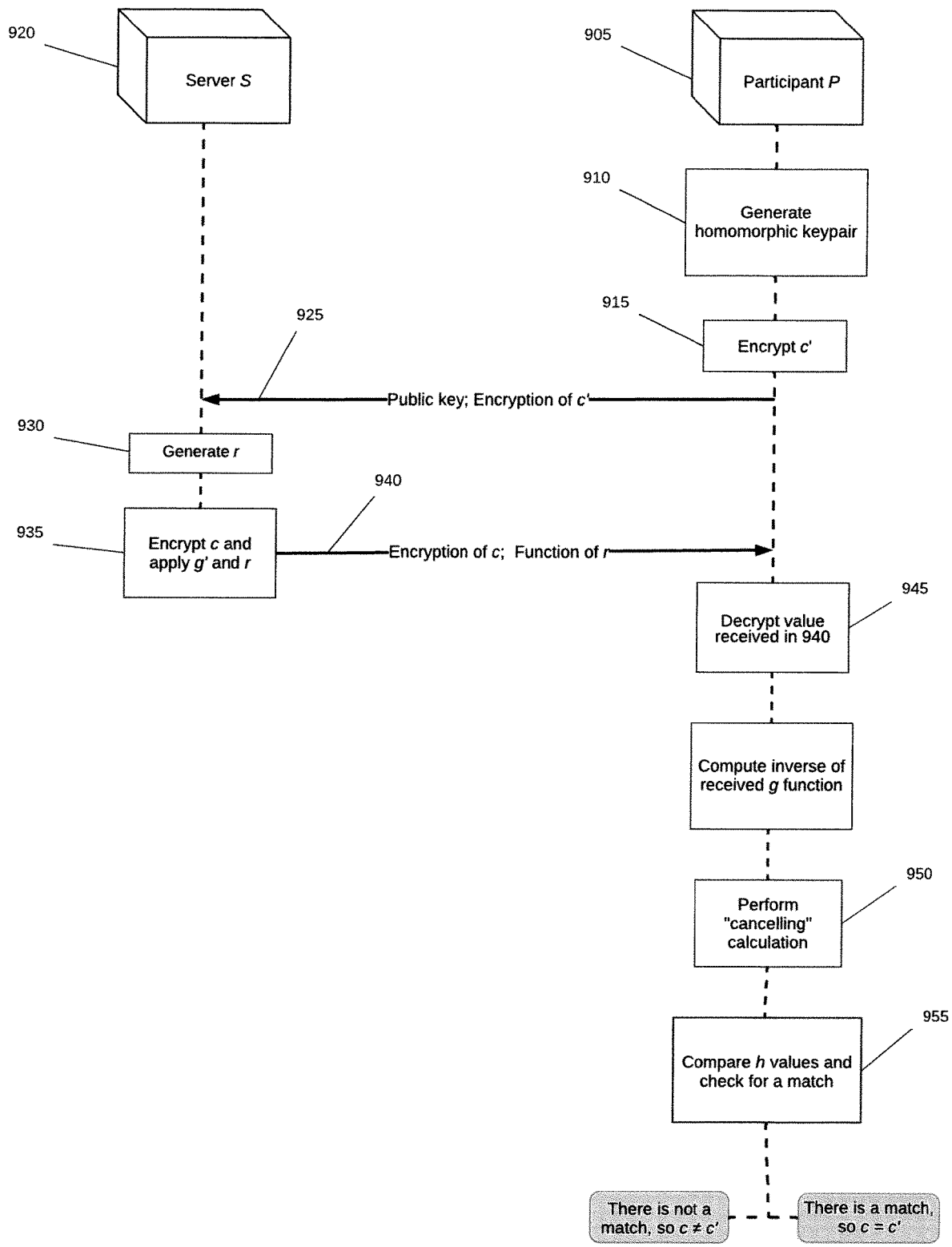
FIG. 9 comprises a flow diagram as configured in accordance with various embodiments of the invention and that illustrates a "Basic Protocol" for data corroboration in which both a Server S and a Participant P behave as expected. The transmissions depicted in FIG. 9 may include an overlay, such as encryption that is subsequently decrypted, that is not explicitly shown.

Referring now to FIG. 9 on "Basic Protocol", Participant P 905, generates a public/secret keypair (pk, sk) at 910 for some encryption/decryption scheme ($E_{pk}$, $D_{sk}$) that supports additive as well as scalar multiplicative homomorphism (as enabled, e.g., by utilizing Pascal Paillier's scheme). Additive homomorphism: there exists an operation +' such that $D_{sk}$ [$E_{pk}(x)+'E_{pk}(y)$]=x+y, where + is addition as defined in the group of plaintexts. Scalar multiplicative homomorphism: there exists an operation *' such that $D_{sk}[x *' E_{pk}(y)]=x*y$, where * is multiplication as defined in the group of plaintexts. Note that a function is denoted here as hom-computable if it can be efficiently computed using only +' and *'. P 905 computes $f_k(c')$ and encrypts the result at 915, where c' is an encapsulation of the data value of P's query against S's 920 data value encapsulation c, and $f_k$ is some keyed function, with secret k owned by P 905 preferably chosen uniformly at random from an appropriately large set, which is one-way and efficiently computable by both S 920 and P 905, giving preference to a cryptographic hash function. As examples of $f_k$: $f_k(x)=H_{SHA-256}(x||k)$, and $f_k$: $f_k(x)$= $HMAC_{SHA-256}(k, x)$. P 905 delivers pk to the Server S 920, and the secret key sk is kept private at 925. P 905 sends $E_{pk}[\eta_k(c')]$ to S 920 at 925. S 920 generates r at 930, which is preferably an integer chosen uniformly at random from an appropriately large set. S 920 encrypts data value encapsulation c associated with a $2^{nd}$ Participant and computes r*' g'($E_{pk}(c)$, $E_{pk}[f_k(c)]$) at 935, where g' is a hom-computable function known to both S 920 and P 905, and *' is the preimage of scalar multiplication on plaintexts under $D_{sk}$. As examples of g': g'(x, y)=x−y, where −' is analogous to the inverse of homomorphic addition, and g': g'(x, y)=x +'y, where +' is defined as before. S 920 sends r *' g'($E_{pk}$(c), $E_{pk}$[$f_k$(c')]) to P 905 at 940. S 920 also sends h(r), or alternatively h(r∥c), to P 905 at 940, where h is a one-way function efficiently computable by both S 920 and P 905, preferably a cryptographic hash function. As examples of h: h(x)=$H_{SHA-256}$(x), and h: h(x)=$HMAC_{SHA-256}$(key, x), where key is a secret shared between P 905 and S 920. P 905 computes $D_{sk}$[r *' g'($E_{pk}$(c), $E_{pk}$[$f_k$(c')])]=r*g(c, $f_k$(c')) at 945, where g is the image of g' under $D_{sk}$ in the space of plaintexts. P 905 then computes (g[c', $f_k$(c)])$^{-1}$ and proceeds to calculate r'=r*g(c, $f_k$(c'))*(g[c', $f_k$(c')])$^{-1}$ at 950. Clearly, if c'=c, then r'=r. Otherwise, P 905 will compute a random value not equal to r. P 905 verifies that the h(r) (or alternatively h(r∥c), depending on choice of implementation) delivered in 940 matches h(r) (potentially concatenated with c') at 955. If so, then c=c' with certainty. Otherwise, c≠c', assuming S 920 has behaved as expected.

Figure 10:
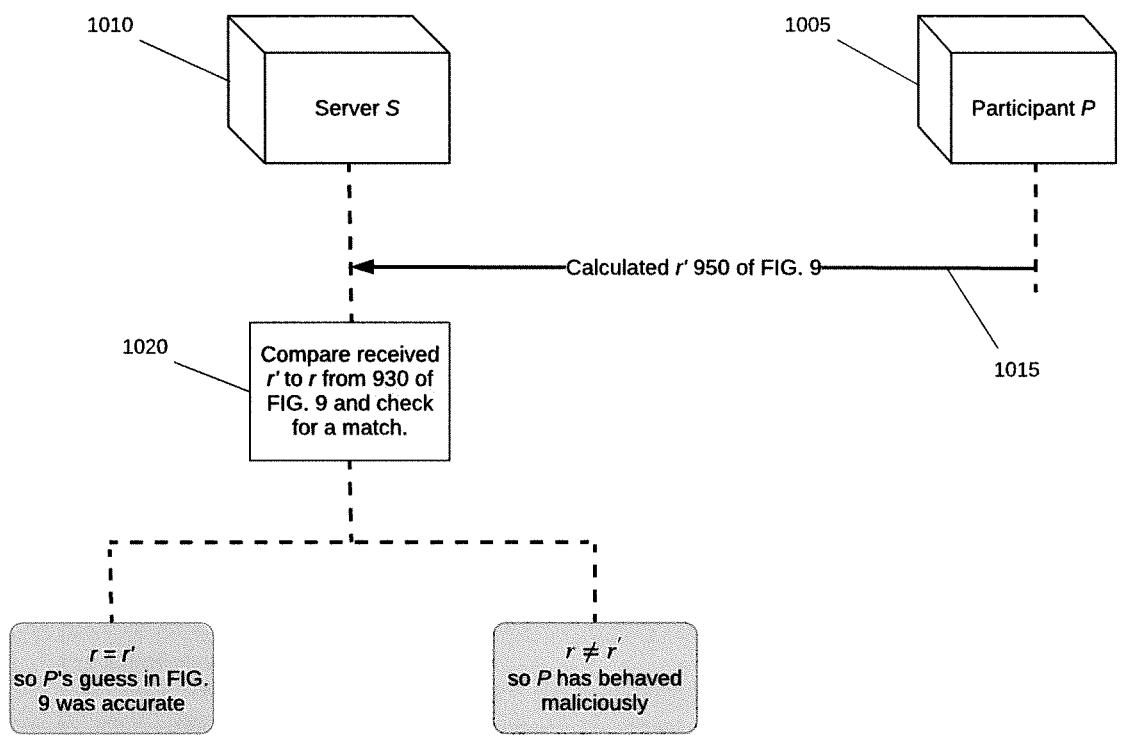
FIG. 10 comprises a flow diagram as configured in accordance with various embodiments of these teachings and that illustrates a "Follow-On Protocol, Option 1" for data corroboration in which a Participant P proves to a Server S that the two share the same data value encapsulation. The transmissions depicted in FIG.10 may include an overlay, such as encryption that is subsequently decrypted, that is not explicitly shown.

Referring now to FIG. 10 on "Follow-on Protocol—Option 1", by one approach this should be executed only when a compliant Participant's c' matches c that underlies the response from Server S. Participant P 1005 sends r' from 950 of FIG. 9 to Server S 1010 at 1015. S 1010 compares r' to its r generated in 930 of FIG. 9 at 1020. If these values match, then P 1005's query in FIG. 9 resulted in a hit against the data value encapsulation c associated with a $2^{nd}$ Participant at S 1010. Otherwise, nothing can be determined about the relationship between P 1005's query and the data value encapsulation c, and P 1005 is exhibiting malicious behavior.

Figure 11:
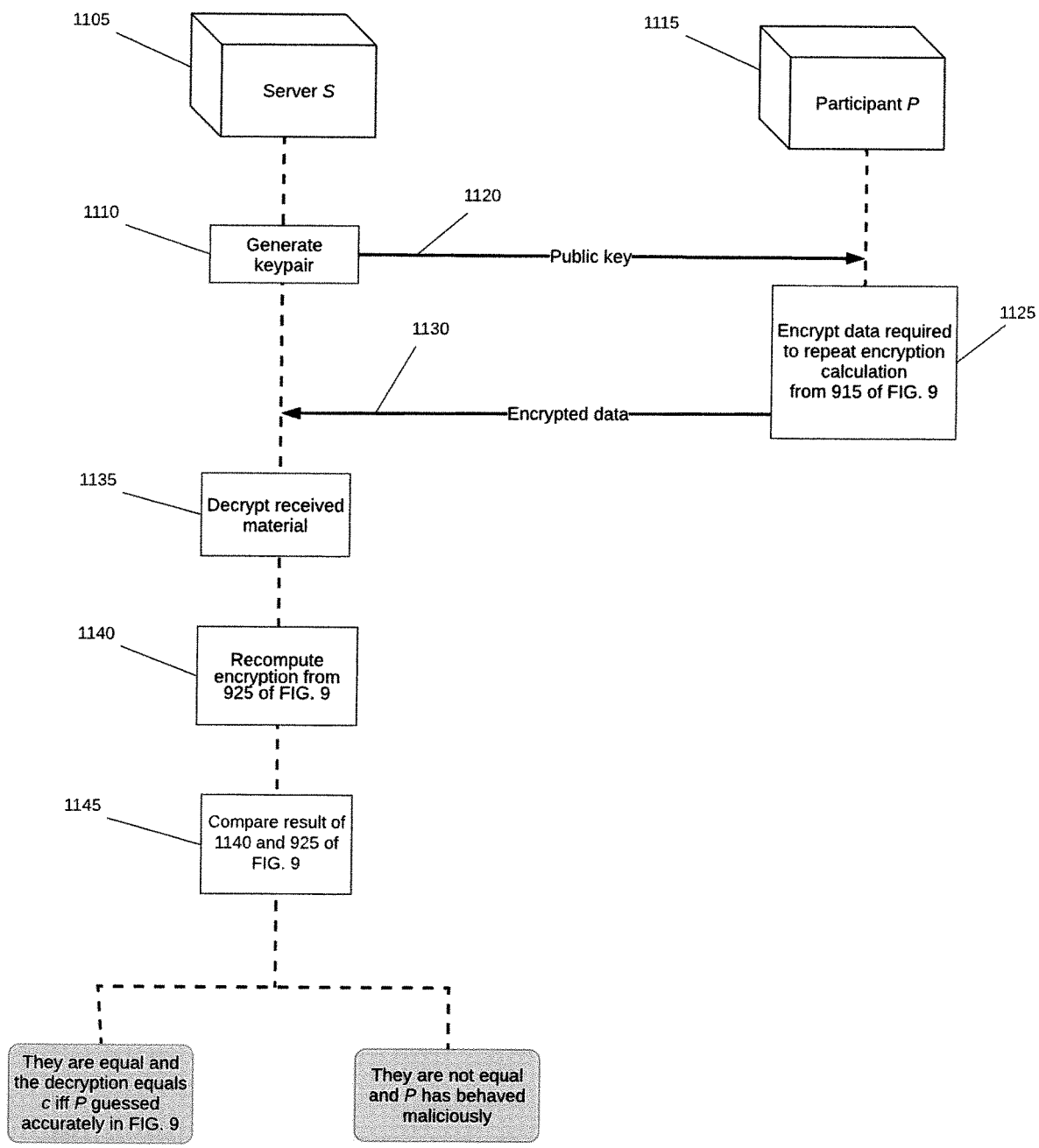
FIG. 11 comprises a flow diagram as configured in accordance with various embodiments of these teachings and that illustrates a "Follow-On Protocol, Option 2" for data corroboration in which a Participant P discloses its data value encapsulation c' to a Server S, and the Server S verifies the authenticity of c' and compares c' to its own data value encapsulation c. The transmissions depicted in FIG. 11 may include an overlay, such as encryption that is subsequently decrypted, that is not explicitly shown.

Referring now to FIG. 11 on "Follow-on Protocol—Option 2", which can be executed in any scenario. Server S 1105 generates an encryption scheme ($E_{pk}$*, $D_{sk}$*) at 1110, possibly such that pk*=sk*. S 1105 delivers pk* to Participant P 1115 at 1120. P 1115 computes $E_{pk}$*(c), $E_{pk}$*(k), $E_{pk}$*($r_1$), . . . , $E_{pk}$*($r_n$n) at 1125, where c' is as in 915 of FIG. 9, k is the key used by P 905 to compute $f_k$(c') in 915 of FIG. 9, and $r_1$, . . . , $r_n$ are all the random values involved in the computation of $E_{pk}$[$f_k$(c')] in 915 of FIG. 9. Computation on $r_1$, . . . , $r_n$ is only relevant if $E_{pk}$ is probabilistic. P 1115 sends all computations from 1125 to S 1105 at 1130. S 1105 decrypts all material received in 1130 using sk* at 1135. S 1105 computes $E_{pk}$[$f_k$(c')] at 1140, using $r_1$, . . . , $r_n$ if relevant, and compares this value to that received in 925 of FIG. 9 at 1145. If these values match, then P 905's query in FIG. 9 was accurate if and only if c' computed via decryption in 1135 equals c held by S 1105. Otherwise, nothing can be determined about the relationship between P 1115's query and the data value encapsulation c, and P 1115 is exhibiting malicious behavior.

Regarding the aforementioned tokens derived from data information associated with the initial data source, or aforementioned tokenization of data information associated with an initial data source, i.e., enabling this via a data tokenization system that is capable of converting INFO to TOKEN: A Participant is granted access to Data associated with an Entity, wherein Data or combination of Data and association of Entity to Data is denoted as INFO. Although the embodiments of tokenization below only cover the use case considering two Servers or processors, other embodiments can make use of a different number of Servers.

Desired properties of a full-fledged solution that generates TOKENs, where the term Backend designates the $1^{st}$ Server or processor and the term Translator designates the $2^{nd}$ Server or processor:

1. A given INFO value must not be exposed outside of the Participant during or after TOKEN generation processing;

2. The mapping of INFO→TOKEN must be:(a) non-reproducible by a passive adversary without access to all processor secrets, whether starting with the INFO value or the TOKEN value, (b) a one-to-one correspondence, and (c) persistently recomputable by the combination of the Backend and Translator;

3. For a given INFO value, the representation of the TOKEN must not correlate across Participant databases, i.e. without additional information it must be computationally infeasible to determine intersections between lists of TOKEN representations stored at distinct Participants;

4. Component-wise compromise of a processor must be ineffective unless continuity is maintained by the adversary between the times of component compromises. Such processor components may take the form of partitions of a processor that each make use of cryptographic keying material that is unavailable to its counterpart partitions;

5. It is preferable to protect against an adversary formulating a matched list of INFO→TOKEN;

6. Considering INFO as "plaintext" and TOKEN as "ciphertext", it is preferable to ensure resilience against known or chosen plaintext attacks as well as against known or chosen ciphertext attacks. That is, knowledge of some INFO-TOKEN pairs must not be helpful in mapping another INFO value to its TOKEN value or to invert another TOKEN value to its INFO value. This must be true even if supplied with the penultimate form of the TOKEN, i.e., with its value immediately prior to the application of one-way hashing if such hashing is used in formulating the TOKEN;

7. It is necessary to ensure that no Participant or processor has access to both an INFO value and its corresponding TOKEN value. It is also necessary to ensure that no Participant or processor can unilaterally gain access to both an INFO value and the identity or pseudonym of the Participant that requested the TOKEN for that INFO.

The resultant TOKENs (which accurately represent their INFO preimages) are useful for the ensuing transaction processing for the purpose of Attestations and Requests against Attestations. Reoccurrences of the same INFO can be matched (without INFO exposure) at the point of actual transaction processing (that involves the Coordinator) but cannot be matched elsewhere (except at the Translator). Only Participant-unique encrypted predecessors of TOKENs appear outside of the Translator and actual transaction processing.

Goal of proposed token generation protocol: To effectively sanitize INFO notwithstanding the fact that it may be computationally feasible to exhaust over the set of legitimate INFO values. In order to accomplish this tokenization, one can introduce a Token Generator Backend processor and a Coordinator front-end processor denoted as a Translator. The Coordinator is responsible for handling transaction processing that makes use of the TOKEN values that are generated via the proposal detailed here.

In one preferred embodiment, the mapping of a given INFO value to its TOKEN value depends on cumulative knowledge of Pohlig-Hellman keys held at two paired partitions of the Backend and at two paired partitions of the Translator. More generally, there may be multiple processors of a given type, such as two Backend processors that communicate with one another and/or with a Participant and/or with a Translator.

Figure 12:
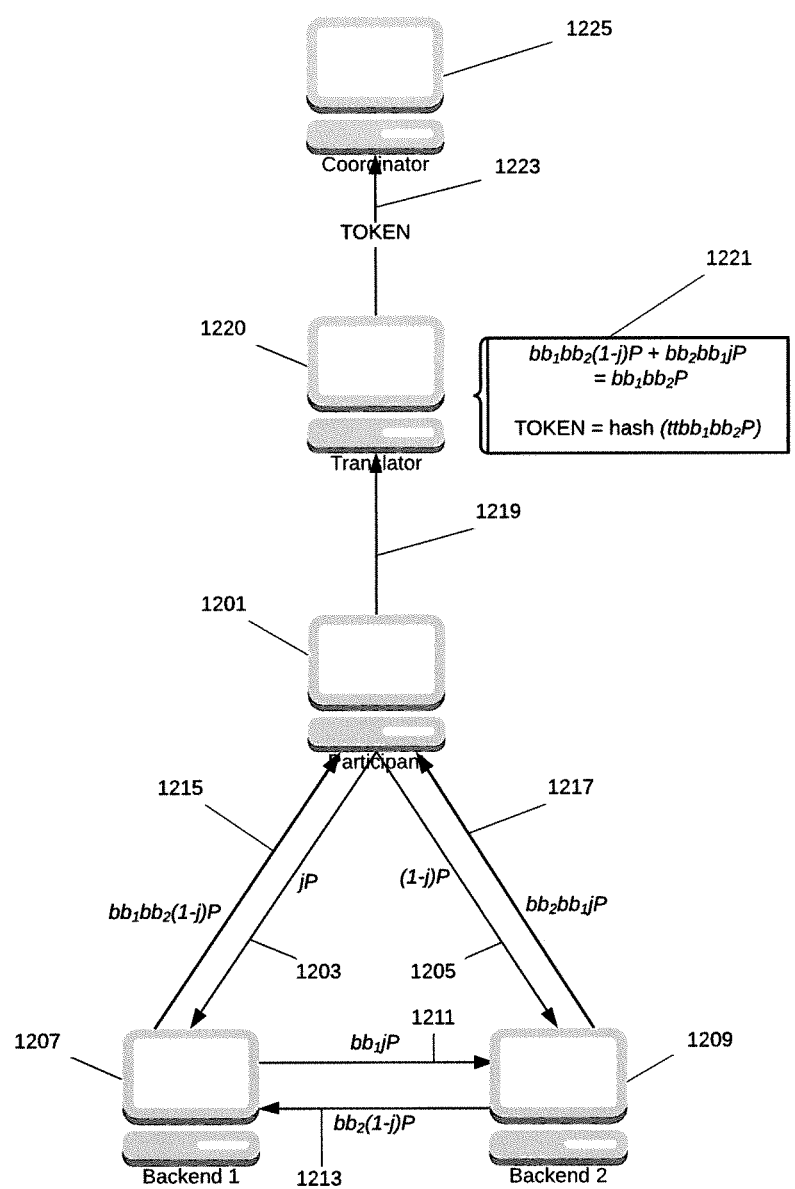
FIGS. 12(a), 12(b) and 12(c) comprise flow diagrams as configured in accordance with various embodiments of these teachings and that illustrate embodiments of TOKEN generation.
Figure 12:
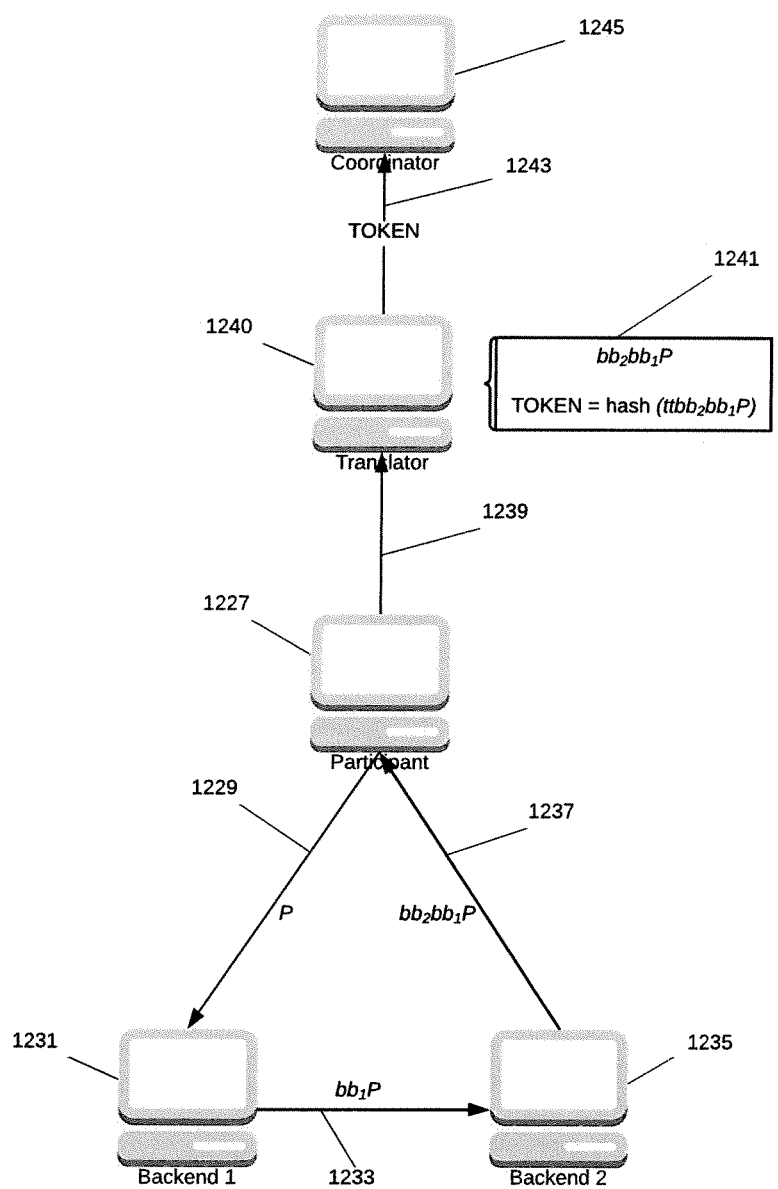

Referring now to FIG. 12(*a*), consider the case where two Backend processors, Backend 1 1207 and Backend 2 1209, respectively, operate using different Pohlig-Hellman keys on two distinct Participant 1201-provided inputs, respectively. Say, Backend 1 1207 operates on jP received at 1203 and Backend 2 1209 operates on (1−j)P received at 1205, where P represents the INFO value. Then Backend 1 1207 and Backend 2 1209 swap their intermediate results comprised of $bb_1 P$ at 1211 and $bb_2(1-j)P$ at 1213. Then each operates again using the same Pohlig-Hellman keys as before, namely, $bb_1$ and $bb_2$, respectively. If Translator 1220 receives via 1219 the final results of the two Backend processors, namely, $bb_1 bb_2(1-j)P$ sent to Participant 1201 at 1215 and $bb_2 bb_1 jP$ sent to Participant 1201 at 1217, then prior to possibly applying its own Pohlig-Hellman key, tt, Translator 1220 can add them at 1221 to derive the result, $bb_1 bb_2 P$ of both Backend processors having operated in cascaded fashion on P, but without P being exposed to either Backend processor. Also as shown at 1221, Translator 1220 can apply a preferably one-way hash function prior to communicating the result to Coordinator 1225 at 1223. Each of Backend 1 1207 and Backend 2 1209 can encrypt its final result for end-to-end access by Translator 1220, in which case, even if communication from the Backends to Translator 1220 is done via passing through Participant 1201, Participant 1201 does not access these final results. Alternatively, Backend 1 1207 and Backend 2 1209 may communicate the final results to Participant 1201 in such a way that Participant 1201 can access these (and add them together), even if they are encrypted in transit to Participant 1201. Note further, that Backend 1 1207 and Backend 2 1209 need not both communicate directly to Participant 1201 or Translator 1220, in that Backend 1 1207 may communicate via Backend 2 1209 (or vice-versa). In such case, the transmission can be protected so that the underlying results/data/metadata is not accessible to the Backend being passed through.

Referring now to FIG. 12(*b*), the process depicted here yields the same result as that of FIG. 12(*a*), but here Backend 2 1235 operates on the intermediate result $bb_1 P$ at 1233 of Backend 1 1231 operating directly on P as received by Backend 1 1231 from Participant 1227 via 1229 to produce $bb_2 bb_1 P$ that is transmitted to Participant 1227 at 1237. Therefore here, unlike in FIG. 12(*a*), P is exposed to Backend 1 1231. Translator 1240 receives $bb_2 bb_1 P$ via 1239 and produces TOKEN at 1241. TOKEN is provided via 1243 to Coordinator 1245. Note further that in FIG. 12(*a*) and FIG. 12(*b*) one of the Backends and a Translator may be under the same authority without that authority learning the INFO value or P value. That would not be the case if the two Backends possessed the same Pohlig-Hellman keys in order to avoid sequential processing, as depicted in FIG. 12(*c*).

Referring now to FIG. 12(*c*), the Translator 1262 receives bbjP and bb(1−j)P via 1261, or potentially receives the sum of these two elliptic curve points, i.e., bbP, if the Participant 1259 can recover both bbjP and bb(1−j)P in unencrypted form and thus add them together, and produces TOKEN at 1263. TOKEN is provided via 1265 to the Coordinator 1267. The Participant 1259 receives bbjP at 1255 from Backend 1 1251 after providing jP to Backend 1 1251 at 1247. Similarly, the Participant 1259 receives bb(1−j)P at 1257 from Backend 2 1253 after providing (1−j)P to Backend 2 1253 at 1249. The Participant 1259 may receive either or both of the values bbjP and bb(1−j)P in a form intended for ultimate use by the Translator 1262 and which does not allow the Participant 1259 to recover the actual value(s).

Figure 13:
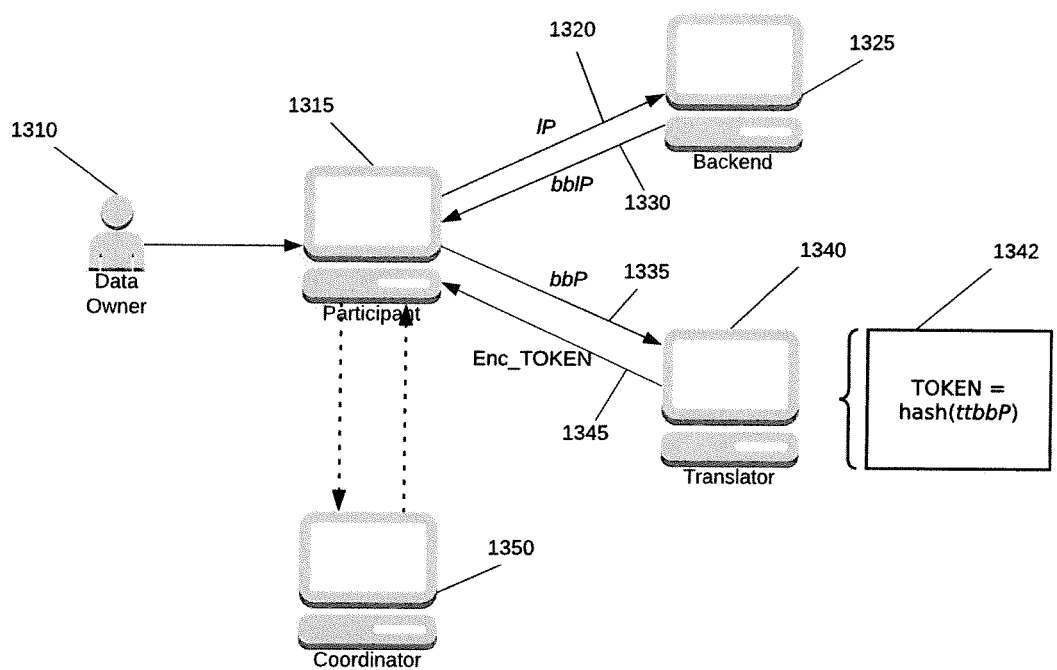
FIG. 13 comprises a flow diagram as configured in accordance with various embodiments of these teachings and that illustrates a further embodiment of TOKEN generation that differs from those of 12(*a*), 12(*b*) and 12(*c*) in that a blinding factor introduced by the Participant is subsequently removed by the Participant rather than by the Translator. The transmissions depicted in FIG. 13 may include an overlay, such as encryption that is subsequently decrypted, that is not explicitly shown.
Figure 14:
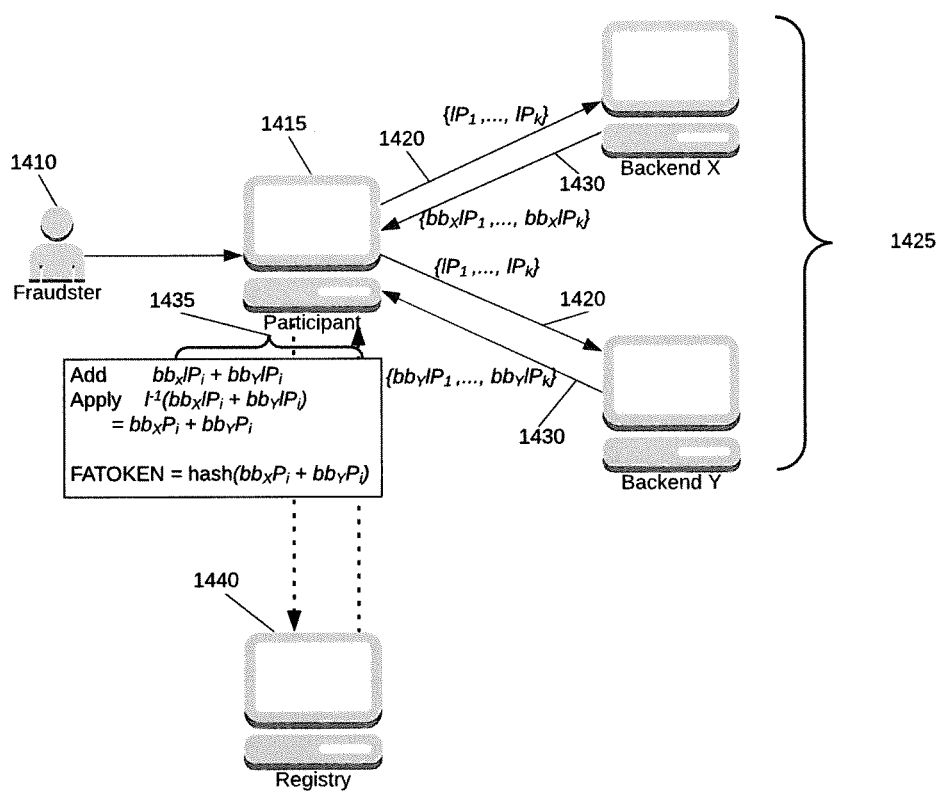
FIG. 14 comprises a flow diagram as configured in accordance with various embodiments of these teachings and that illustrates an embodiment of Fraud Attribute Token (FATOKEN) generation. The transmissions depicted in FIG. 14 may include an overlay, such as encryption that is subsequently decrypted, that is not explicitly shown.
Figure 15:
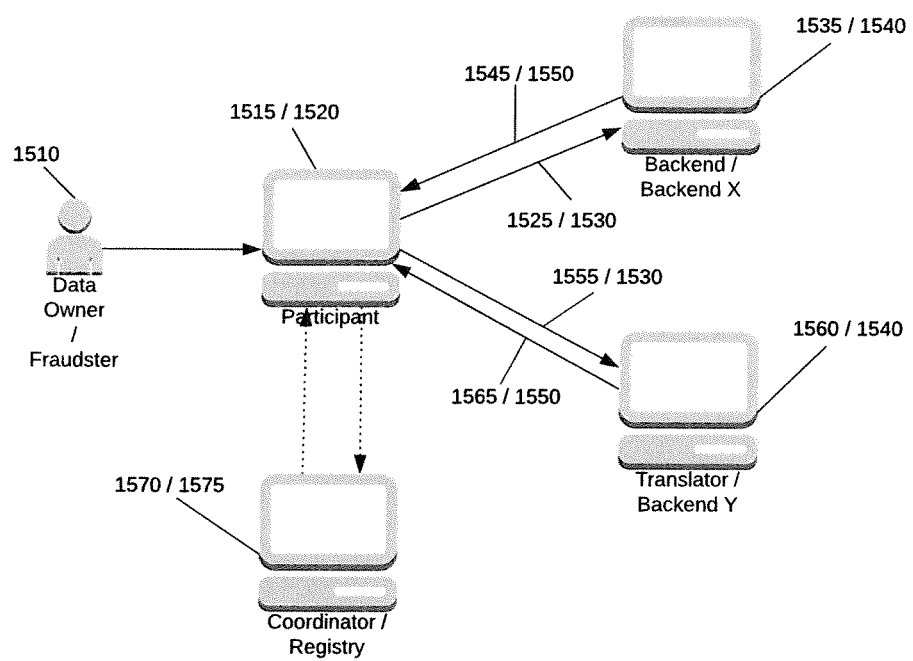
FIG. 15 comprises a flow diagram as configured in accordance with various embodiments of these teachings and that illustrates a high-level overview of a hybrid embodiment, suitable for generation of TOKENs and FATOKENs. The transmissions depicted in FIG. 15 may include an overlay, such as encryption that is subsequently decrypted, that is not explicitly shown.

FIG. 13, FIG. 14 and FIG. 15 depict embodiments in which, unlike the embodiments depicted in FIG. 12(*a*), FIG. 12(*b*) and FIG. 12(*c*), the randomized blinding factors that differentiate multiple instances of the same P value are removed (as well as initiated) by the Participant. Also unlike the embodiments depicted in FIG. 12(*a*), FIG. 12(*b*) and FIG. 12(*c*), in FIG. 13 only a single Backend is depicted.

Referring now to FIG. 13 as an alternative embodiment of generation of TOKENs, an Entity or data owner 1310 provides information to the Participant 1315 from which the Participant 1315 derives an elliptic curve point P. P may be representative of INFO as previously discussed. Participant 1315 blinds P using a blinding/hiding factor, l, to produce lP as transmitted to the Backend 1325 at 1320. Upon receiving bblP from the Backend 1325 at 1330, the Participant 1315 removes the blinding factor, l, and transmits the resultant value, bbP, to the Translator 1340 at 1335. The Participant 1315 receives Enc_TOKEN from the Translator 1340 at 1345. Enc_TOKEN can be used with the Coordinator 1350, where preferably the Coordinator 1350 is equipped to recover TOKEN from Enc_TOKEN. Note that TOKEN is derived by the Translator 1340 at 1342, and Enc_TOKEN is derived by the Translator 1340 from TOKEN via an encryption mechanism. Per 1330, bblP is unique per instance, while, per 1335, bbP is not. Preferably immediately following removal of l from bblP by the Participant 1315, resulting in bbP, bbP is encrypted uniquely for transmission to the Translator 1340 at 1335. Such encrypted version may be stored in a database associated with the Participant 1315, appearing differently at each Participant. Such encrypted version may be resent to the Translator 1340 if need be. Such need may arise, for example, if the encryption key that was used by the Translator 1340 to formulate Enc_TOKEN has been updated. Enc_TOKEN of 1345 may be computed by the Translator 1340 uniquely at each instance, e.g., based on use of a unique initialization vector even if the encryption key is reused. The encryption key used to formulate Enc_TOKEN, and its successors if the key is updated, may be shared between the Translator 1340 and the Coordinator 1350 while not being made available to the Participant 1315. Note that variations are possible, such as where the Translator 1340 and the Coordinator 1350 are combined (which may affect the flow and/or the use or non-use of encryption).

Because the requirements are different for Fraud Attribute Tokens, FATOKENs, than they are for TOKENs, FATOKENs can be generated via parallel rather than sequential processing, since removal by the Participant of the blinding factor l can safely be delayed without adversely impacting the ascertained level of security of the token generation procedure or protocol. In this case, unlike that of the TOKEN generation procedure or protocol of FIG. 13, the generation of the final values of FATOKEN occurs at the Participant, rather than at a Translator.

Referring now to FIG. 14 for generation of FATOKENs, an Entity or data owner 1410, which may be a fraudster pretending to be an owner of data, provides data to the Participant 1415. One or more elements of such received data may be used by the Participant 1415 to generate P values representative of data attributes, denoted as $P_1, \ldots, P_k$. Via 1420, the Participant 1415 sends blinded versions of $P_1, \ldots, P_k$, namely, $lP_1, \ldots, lP_k$, to both Backend X and Backend Y, denoted jointly as 1425. Backend X and Backend Y can act in parallel to generate $bb_x lP_1, \ldots, bb_x lP_k$, and $bb_y lP_1, \ldots, bb_y lP_k$, respectively, as transmitted to Participant 1415 at 1430. At 1435, Participant 1415 computes over each pair of $bb_x lP_i$ and $bb_y lP_i$, for i=1 to k, to generate the FATOKEN values. Note that neither Backend X nor Backend Y acting alone, or even acting together if the blinding factor l remains unknown to them, has the capability to correlate FATOKENs to its contribution at 1430. The FATOKENs can be used by the Participant 1415 with the Registry 1440, which may be considered as a Fraud Attributes Registry in this context. One such use entails the Participant 1415 attesting to or requesting against FATOKENs. During processing of a Request, the Registry 1440 may return information indicative of corroboration, via previously submitted Attestations posted by or on behalf of requesting network elements acting within the attestor role, of FATOKEN values submitted as a part of the Request made by a requesting network element acting within the requestor role. Note that unlike Attestations and Requests depicted in FIG. 5 and FIG. 7, Requests here need not incorporate any function of TOKEN values. Furthermore, datatypes here may be designated as labeled or unlabeled.

Referring now to FIG. 15 for a hybrid token generation procedure or hybrid token generation protocol, both TOKEN generation and FATOKEN generation are accommodated. 1510 may correspond to a legitimate Entity or data owner or one that is potentially acting fraudulently, i.e., as a fraudster. The Participant 1515 denotes the Participant as involved in acquiring or using TOKENs, while the Participant 1520 denotes the Participant as involved in acquiring or using FATOKENs. 1535 and 1540 denote that processor acting as the Backend 1325 of FIG. 13 or as Backend X at 1425 of FIG. 14, respectively. 1560 and 1540 denote that processor acting as Translator 1340 of FIG. 13 or as Backend Y at 1425 of FIG. 14, respectively. 1570 and 1575 denote that processor acting as Coordinator 1350 of FIG. 13 or as Registry 1440 of FIG. 14, respectively. 1525 and 1555 denote transmissions from the Participant pertaining to TOKEN generation, while 1530 denotes transmissions from the Participant pertaining to FATOKEN generation. 1545 and 1565 denote transmissions pertaining to TOKEN generation, from the originating processor acting as the Backend or the Translator, respectively. 1550 denotes transmissions pertaining to FATOKEN generation, from the originating processor acting as Backend X or Backend Y.

The ensuing discussion focuses, in more detail, on TOKEN generation. However, the major principles are applicable as well to FATOKEN generation. A recipient of a value to be operated on via Diffie-Hellman or Pohlig-Hellman private keys executes an appropriate public key validation routine per NIST Special Publication 800-56Ar3 specifications. By one approach, Public Key Validation must be done every time a machine receives (possibly after local decryption) a purported elliptic curve point from an external source (e.g., processor partition-to-processor partition, Participant-to-processor or processor-to-Participant), and intends to operate on it via scalar multiplication. Within the context considered here, the only necessary check is to make sure the received value corresponds to a point on the specific intended curve, because of the specifications of P-256 (the elliptic curve used here as example). A recipient of an ECDSA digital signature preferably verifies that signature and the purported authorization of the signer before taking action on a request purported to have originated from a Participant (as indicated, e.g., by request type). As an example, a processor partition may verify a public key certificate that chains up to a trusted root wherein that public key certificate is currently valid and identifies the subject public key as owned by a Participant; that subject public key is used to verify the request signature. Whenever an HMAC value is received, such value is independently checked for a match against a locally computed HMAC value. HMAC (Hashed Message Authentication Code) is an example symmetric key-based mechanism for verifying data integrity and authentication of the entity as one that has knowledge of the HMAC key. The token generation protocol is intended to provide security in-depth so as not to rely solely on transport-level security, if any, directly between processor partitions (or through an intermediary gateway) and/or between a Participant and the Token Generator (as processor(s) or front-end to processor(s)) and/or between a Participant and the Coordinator or the Registry. The Pohlig-Hellman Cipher and One-Pass Diffie-Hellman Key Exchange are used below most predominantly. Throughout the token generation protocol a combination of randomized and deterministic operations is deployed due to the nature of what needs to be accomplished. In the case of TOKEN generation, the goal is to make sure that the overall effect of the token generation protocol is deterministic so that each INFO ends up with the same TOKEN every time. However, randomization is deployed for the following reasons: to hide INFO from the Backend (until it is safe to remove such randomization following transformation by the Backend partitions); to obscure partition-to-partition communications from eavesdroppers; to make knowledge of partition-to-partition Key Confirmation keys dependent on knowledge of randomizer outputs that are not available via one-time-compromise of a processor partition. Eavesdroppers of partition-to-partition communications are unable to distinguish processing of previously processed inputs from processing of never-before processed inputs. Randomized hiding of INFO by a Participant is also potentially useful to make the Backend oblivious of whether it is processing previously "seen" INFO or not. For example, Processing by the Backend of the same INFO that results in differential results may be flagged as anomalous during audit. In general, each processor may be monolithic or may be split into two or more partitions. Here, one can split the processors (Backend and Translator) into 2 partitions each, where partitions are preferably independently secured modules that are paired with counterpart partitions during setup. In the non-malicious case, both partitions will produce the same result. This may be checked for quality of service. However, this is not meant to imply that the Participant necessarily receives 2 copies of the data. Where implementation involves two processors, namely the Backend and the Translator, the mapping of a given INFO to its TOKEN may depend on cumulative knowledge of Pohlig-Hellman keys held at two paired partitions of the Backend and at two paired partitions of the Translator.

Using the elliptic curve Pohlig-Hellman cipher, Alice wants to ultimately communicate a given (plaintext) elliptic curve point, P, on a public elliptic curve to Bob. Referring now to FIG. 16, Alice and Bob have a shared secret l, where l is an integer between 1 and n−1 inclusive, where n is the prime order of P. Since this requires a shared secret between Alice and Bob, Pohlig-Hellman is a symmetric key cipher although it makes use of elliptic curve scalar multiplication that is common to asymmetric/public-key cryptographic algorithms such as Elliptic Curve Diffie-Hellman (ECDH) key agreement and Elliptic Curve Digital Signature Algorithm (ECDSA). At 1610, Alice chooses P, computes Q=lP and sends that value to Bob. At 1620, Bob decrypts the received value Q to recover P by applying $l^{-1}$ mod n.

Referring now to FIG. 17, Alice wants to communicate a ciphertext, Q, to Bob but does not want Bob to recover the plaintext, P. Here the integer k is a secret only Alice knows. At 1710, Alice chooses P, computes Q=kP and sends Q to Bob. At 1720, Bob receives the value Q, but lacking knowledge of k cannot decrypt Q.

Referring now to FIG. 18, there are three actors, namely, Participant, Backend and Translator. These three actors can interact in order to create or generate a TOKEN. The Participant applies the elliptic curve Pohlig-Hellman Cipher of FIG. 16, playing the encryption role on a chosen, generated or derived value of P at 1810 and the decryption role on the result of 1820 at 1830. Both the Backend and the Translator apply the one-way elliptic curve Pohlig-Hellman cipher of FIG. 17, applying it to the result of 1810 at 1820 and to the result of 1830 at 1840, respectively. The effect of the encryption and decryption operations at the Participant is to blind P, as representing INFO, from the Backend without ultimately affecting its value. That is, multiple executions of the three-part operation, comprised of 1810, 1820 and 1830, on a particular INFO value as initiated independently each time by the same Participant or across multiple Participants result in the same value as if only the Backend operated directly on the INFO value. One-Way elliptic curve Pohlig-Hellman is used to create TOKENs from INFO values to ensure the originated INFO value is not feasibly discoverable from the corresponding TOKEN.

Alice and Bob want to establish a shared secret between them. Bob acts first and creates a public key and publishes this. At any time after this point, Alice may use the result of this process to create a shared secret between the two of them via a one-pass elliptic curve Diffie-Hellman key exchange. Referring now to FIG. 19, and to describe one-pass elliptic curve Diffie-Hellman more specifically, at 1910 Bob sets up a relatively static private-public key pair $[n_B, n_B G]$. At 1920, Alice computes an ephemeral private-public key pair $[n_A, n_A G]$ and applies $n_A$ to Bob's public key to compute a secret that is shared with Bob. The mechanism by which Bob recovers the shared secret, as depicted at 1930, is that Bob applies $n_B$ to Alice's ephemeral public key. Not shown in FIG. 19 is that Alice may receive Bob's public key through trusted mechanisms so that it is known to actually be associated with Bob, and that Bob may be assured that the ephemeral public key purported to be associated with Alice actually is. One such mechanism for Bob to gain that assurance is that Alice signs the ephemeral public key using a relatively static signature generation private key that is associated with a signature verification public key that is trusted by Bob to be associated with Alice. During the token generation protocol, the processors act as Bob of FIG. 19 and create their public keys during set-up. The Participants act as Alice of FIG. 19 in order to utilize a shared secret with a processor to derive or transport key(s) to be used to securely communicate information to the processor and to securely receive information from the processor (where, along with associated initialization vectors, use may be made of authentication tags for integrity verification in addition to ciphertext for confidentiality protection). Examples of such information include an elliptic curve point comprising a blinded version of INFO that is sent from a Participant to a Backend processor and an unblinded version of an intermediate-TOKEN value received by the Participant as information from the Backend that is sent by the Participant to a Translator processor that responds to the Participant with information comprised of a TOKEN value that has been end-to-end encrypted for later use by the Participant for transaction processing involving the intended target of the end-to-end encryption. This intended target may be, for example, a Coordinator acting in the role of a coordinating network element. The intermediate-TOKEN value that is recovered by the Participant as a result of preferably verifiable decryption may be processed, e.g., to remove a blinding factor, prior to being encrypted for targeted delivery to a Translator as preferably verifiably originating from the Participant.

The Randomized Shared Secret Derivation (RSSD) algorithm is used whenever doing a Pohlig-Hellman computation or the recipient side of a One-Pass Diffie-Hellman at a partitioned Backend or Translator:

The algorithm is expressed as RSSD[x; Q; 2];

The processor performing the algorithm (Backend, or Translator) will be split into 2 partitions;

Each partition i generates an $r_i \in [1, n-1]$;

Each partition i will own $x_i$ where $x=(x_1, x_2)$;

Use is made of a point Q on the curve E.

Referring now to FIG. 20, the steps of RSSD are shown in the case that a processor is partitioned into two sub-processors. At 2020, each partition i applies to Q its $r_i$ of 2010, and passes the result to the other partition. At 2030, each partition i applies to the value it received from 2020 its $x_i$, and passes the result to the other partition. At 2040, each partition i privately applies to the value it received from 2030 its $r_i^{-1} x_i$ mod n. Note that if the same processor type has multiple partition pairs that each comprise a processor of the given type in the instance of load balancing and/or system recovery capability, each partition pair must have an associated number. A processor partition is identified with an ID made up of its partition number, {1} or {2}, and the partition pair number to which it belongs.

One can use the following process when running RSSD to protect the communication within a processor. A header is added to the data being passed that includes the processor partition ID and pass type (PH for Pohlig-Hellman and DH for Diffie-Hellman) and pass number (e.g. {PH2} or {DH1}). This is HMAC'ed using the current h-key within this processor. The result is the HMAC tag that is passed with the data: (data, $HMAC_{h\text{-}key}$ (data‖Processor Partition ID‖PH or DH and pass #)). For example, the second pass of a Pohlig-Hellman computation sent from partition 1 to partition 2 would be as follows: $(x_1 r_2 Q, HMAC_{h\text{-}key} (x_1 r_2 Q \| \{1\} \| \{PH2\}))$.

The above example assumes there are not several partition pairs of the same processor type. Before a partition acts on any point given to it by another partition or provided by a Participant, it must perform public key validation, which in this case just necessitates the check that the point is on the elliptic curve.

For maximal effectiveness of the communications blinding provided here by $r_1$ and $r_2$ (as well as use of $r_1$ and $r_2$ in formulating Key Confirmation HMAC keys using the construction $r_1 r_2 Q$, as discussed subsequently), $r_1$ and $r_2$ values should each be an output of a random bit generator (RBG) that provides Prediction Resistance through its consistent use of a Live Entropy Source.

The RSSD algorithm can be summarily characterized as follows: Secure Multi-party Computation (SMC) method of accomplishing static recipient-side One-Pass DH or static PH encryption, whereby: Each partition does (1) ephemeral Pohlig-Hellman encryption, followed by (2) static side of static-ephemeral Diffie-Hellman communication, followed by (3) simultaneously applied ephemeral Pohlig-Hellman decryption and static side of static-ephemeral Diffie-Hellman shared secret derivation. In (3), Pohlig-Hellman and Diffie-Hellman are "simultaneously applied" in that this joint computation is most efficiently done by using, for example, $r_1^{-1} x_1$ mod n as a scalar multiplier of $x_2 r_1 Q$. Modular multiplication of two scalars is significantly more computationally efficient than scalar multiplication of an elliptic curve point (although $(r_1^{-1} x_1 \text{ mod } n)(x_2 r_1 Q) = r_1^{-1}(x_1 (x_2 r_1 Q))$).

Use can be made of a Generalized Randomized Shared Secret Derivation algorithm that handles k partitions of a Backend or Translator. In the implementation:

The input for this algorithm is expressed as RSSD[x; Q; k];

The processor performing the algorithm (Backend, or Translator) will be split into k partitions;

Each partition i generates an $r_i \in [1, n-1]$;

Each partition i will own $x_i$ where $x=(x_1, x_2, \ldots, x_k)$;

Use is made of a point Q on the curve E.

Referring now to FIG. 21, the steps of RSSD are shown in the case that a processor is partitioned into k sub-processors. At 2120, each partition i applies to Q its $r_i$ of 2110, and passes the result to partition i+1 mod k. At 2130, each partition i applies to the value it received from 2120 its $x_i$, and passes the result to partition i+1 mod k. This is followed by k−2 iterations of: each partition i applies to the last value it received from 2130 its $x_i$, and passes the result to partition i+1 mod k. At 2140, each partition i privately applies to the last value it received from 2130 its $r_i^{-1} x_i$ mod n.

Computations for system setup are described below prior to describing the steps of the token generation protocol to be done every time a TOKEN or a batch of TOKENs is generated.

Figure 22:
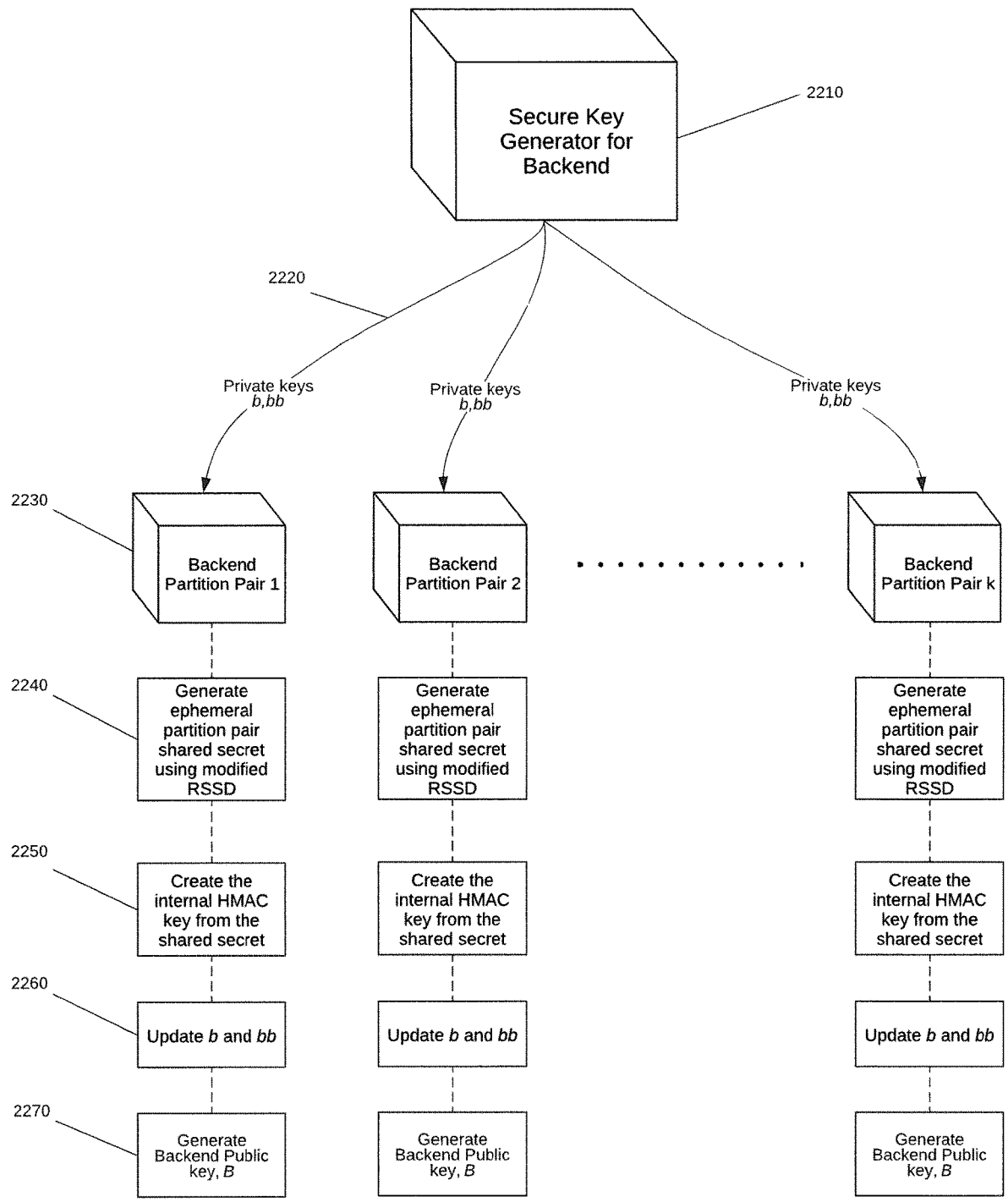
FIG. 22 comprises a flow diagram as configured in accordance with various embodiments of these teachings and that illustrates Backend key generation in the case that there are multiple processors of the Backend processor type where each processor comprises a partition pair.
Figure 24:
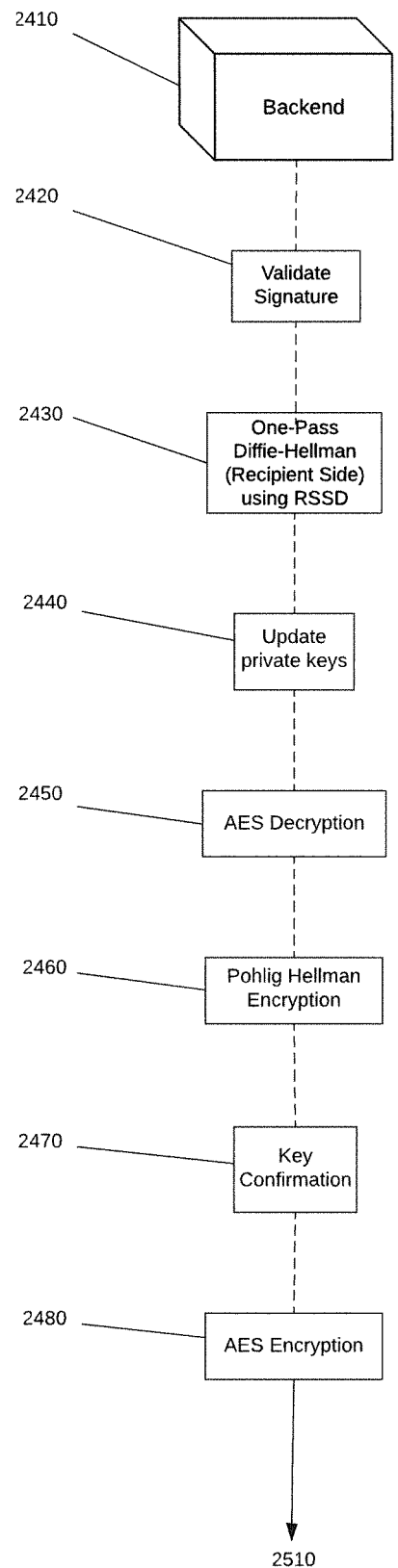
FIG. 24 comprises a flow diagram as configured in accordance with various embodiments of these teachings and that illustrates the Backend's role in the tokenization process. This includes the recipient side of the One-Pass Diffie-Hellman and the Backend's part of the Pohlig-Hellman process.

Referring now to FIG. 22 for the case of the Backend 2230, initial keying material, namely, preferably randomly or pseudo-randomly chosen $b=(b_1, b_2)$ and $bb=(bb_1, bb_2)$ mod n, i.e., where each value of a pair is considered an element of [1, n−1], is preferably securely generated at 2210 and preferably securely retained for use in provisioning and pairing processor partitions within a controlled environment at 2220. Such controlled environment may involve physical security measures and/or multi-person control, e.g., in a scenario where communications are localized. Such controlled environment may alternatively or additionally involve the use of pre-placed keys, e.g. where setup communications are conducted remotely over potentially open channels. The case depicted in FIG. 22—that does not have the partitions themselves jointly generate initial keying material—is useful for enabling load balancing and ensuring availability and recoverability, in that multiple partition pairs can operate independently, each as a processor of a given processor type (where FIG. 22 depicts the Backend processor type, understanding that the Translator processor type may be similarly handled) without sacrificing unique mapping of INFO values to TOKEN values. The distribution step may be considered unnecessary in the case that there exists only a single partition pair that never needs to have its keys restored. Participants can remain oblivious to which partition pair actually processes their requests. For partition security, each partition pair can run RSSD[e;G;2] at 2240, where $e=(e_1, e_2)$ is comprised of randomly chosen ephemerals $e_1$ and $e_2$, each in [1, n−1], to create the processor-pair internal shared secret. If a degenerate form of RSSD[e; G; 2] is used, i.e., where $r_1=1$ and $r_2=1$, then $r_iG$ need not be communicated if the partitions are programmed to eliminate that pass. At 2250, derive an HMAC key, h-key, from this shared secret in each partition (e.g., by using a standard extract-and-expand method). This is the internal HMAC key that will be regularly updated and used for intra-processor entity authentication and data integrity between paired partitions. Extract-and-expand can also be used during set-up to update $b_1$, $b_2$, $bb_1$ and $bb_2$ at 2260. The updating process is depicted in FIG. 24 at 2440. In the case that there is only a single partition pair, the following may happen at 2260: Each partition i generates random $b_i$ chosen in [1, n−1]; $b_i$ is archived by the $i^{th}$ partition of Backend in secure offline storage in case they are required for recovery; these $b_i$'s are retained locally to be altered later, keeping the products $b_1 b_2$ mod n intact; the $i^{th}$ partition of Backend partition pair also generates and retains private key $bb_i$ chosen in [1, n−1] at 2260. These $bb_i$ are used to perform Pohlig-Hellman encryption. Securely archiving these will enable duplication of Pohlig-Hellman ciphertext upon system recovery, as is necessary if consistency with past generation of TOKEN values is to be maintained. Any Backend partition pair (whether only one or more) can run RSSD[b;G;2] at 2270 to generate the public key $B=b_1 b_2 G$. This public key is used by the initiator for one-pass Diffie-Hellman Key Exchange. Note: The b is used on the recipient side of the one-pass Diffie-Hellman to reconstruct the shared secret. As described above relative to generation of the ephemeral shared secret, a degenerate form of RSSD[b; G; 2] may be applied here. Backend public key $B=b_1 b_2 G$ is made public using a standard public key certificate or other mechanism, such as publication on a blockchain entailing submitted transactions that are signed by an authority recognized by relying parties to have this responsibility. FIG. 22 may also be applied in the case of the Translator for proper key generation.

Figure 23:
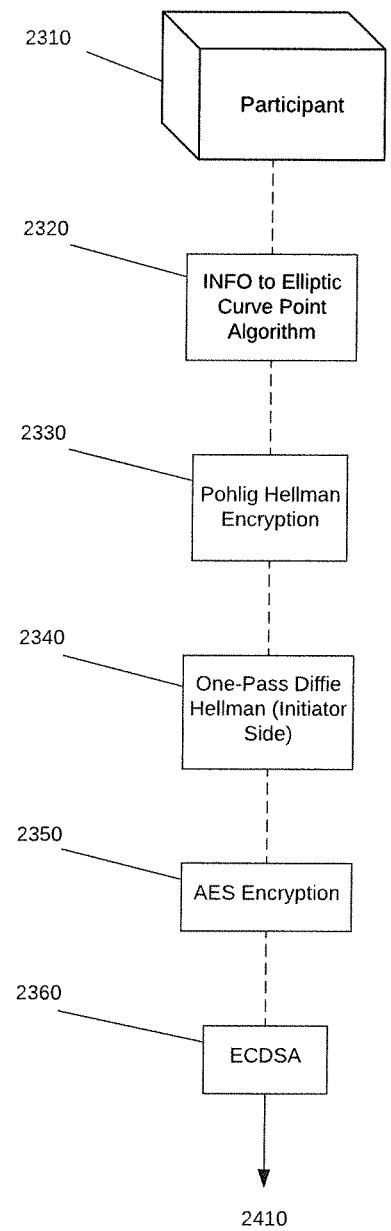
FIG. 23 comprises a flow diagram as configured in accordance with various embodiments of these teachings and that illustrates the Participant's initial process when requesting a TOKEN before any processing by the Backend or the Translator. It represents the obscuring of INFO for processing with the Pohlig-Hellman encryption and the initiator's steps of the One-Pass Diffie-Hellman.

Referring now to FIG. 23, the Participant 2310 generates point P from INFO on the elliptic curve E at 2320 in the following way: (1) Take in the INFO; (2) Append the INFO with a 16-bit pad that starts at all 0's, i.e. (INFO∥Pad)= (INFO∥00000000 00000000); (3) Compute a 256-bit hash value creating $x_0$=hash(INFO∥Pad); (4) Determine if ($x_0^3 - 3x_0 + b$) mod p is a quadratic residue, say $y^2$ mod p. If not, add one to the pad and do this step over; (5) Once a valid $x_0$ is found, define $x_* = x_0$. There are $$\frac{p+1}{2}$$

quadratic residues (including 0). Therefore, every time an $x_0$ is tried, there is $$\frac{1}{2} + \frac{1}{2p} \sim \frac{1}{2}$$

change that $x_0$ yields a quadratic residue. Since there is approximately a ½ probability that $x_0$ yields a quadratic residue, this loop should not be extensive. If this does happen to run through all 16 bits before finding a quadratic residue, replace hash by hash(hash) and re-run (c) and (d). Alternatively to use of this potentially iterative technique, (e.g., hash(hash(hash(INFO∥Pad)))), the bit-size of the pad can be made larger, e.g., a 32-bit pad; (6) The following additional check should be added in order to avoid bias: Reject any candidate x-coordinate values that involve modulo p wrap-around, i.e., for which $2^{256}$>hash(INFO-∥Pad)>p−1 (or for which $2^{256}$>hash(hash(hash(INFO∥ Pad)))>p−1 if iterative hashing is required). This bias-avoidance technique has negligible impact on computation time, since $$2^{-33} = \frac{2^{223}}{2^{256}} < \frac{2^{256} - p}{2^{256}}$$

$$= \frac{2^{256} - (2^{256} - 2^{224} + 2^{192} + 2^{96} - 1)}{2^{256}} < \frac{2^{224}}{2^{256}}$$

$$= 2^{-32};$$

(7) Denote by y, the smaller of y and −y reduced mod p, such that $y^2=x^{*3}-3x^*+b$ mod p. Point P is then defined as (x*, y*). The Participant 2310 now performs the Pohlig-Hellman Cipher at 2330 by generating a random l in [1, n−1] and computing I=lP. Compute and retain $l^{-1}$ mod n until it is applied (after decryption) to the response from the Backend. The Participant 2310 acts as the initiator in a One-Pass Diffie-Hellman at 2340. First, they generate a random integer $rand_p$ for an ephemeral private key to be used in the next step for one-pass Diffie-Hellman computation. The Participant 2310 now multiplies B by $rand_p$ to produce $rand_pB=rand_pb_1b_2G$, which is the one-pass Diffie-Hellman shared secret [ss; Par↔Back]. Participant 2310 now multiplies G by $rand_p$ to produce $rand_pG$ which is the public key [pk; Par↔Back] used for the one-pass Diffie-Hellman. This will be communicated to the Backend to enable the Backend to compute the shared secret. The Participant 2310 encrypts at 2350 using the [ss; Par↔Back]. They extract-and-expand on [ss; Par↔H Back] into [key; Par→Back] and [key; Back→Par]. Encrypt I with AES-GCM mode using [key; Par→Back] for the key. The [key; Back→Par] key is used to decrypt the material from the Backend when it returns information. The IV for the AES-GCM mode is randomly generated for use in encryption and transmitted for use in decryption by the Backend. Alternatively, IV values can be generated via extract-and-expand, preferably as long as it is assured not to use the same IV value to encrypt subsequent messages using the same key. [ss; Par↔Back], [key; Par→Back] and ephemeral private key $rand_p$ should be discarded. The Participant 2310 signs $Package_{Par \to Back}=$ $(Enc_{[key; Par \to Back]; IV}(I); [pk; Par \leftrightarrow Back]; IV)$ at 2360 using their ECDSA signature generation private key to produce $Sig_{Par \to Back}$. The Participant 2310 sends ($Package_{Par \to Back}$; $Sig_{Par \to Back}$) to the Backend 2410 on FIG. 24.

Referring now to FIG. 24, the Backen 2410 verifies that $Sig_{Par \to Back}$ is a valid signature at 2420. The Backend 2410 acts as the recipient in a One-Pass Diffie-Hellman at 2430. First, they must perform public key validation by checking that $rand_pG$ is on the elliptic curve. The Backend 2410 now runs RSSD[b; $rand_pG$; 2] to recover $rand_pB=rand_pb_1b_2G$ which is the shared secret ss; [Par↔Back] for use in one-pass Diffie-Hellman. If a detectable error occurs during this algorithm, restart this algorithm. Anytime persistent errors in the Backend and Translator occur for more than a chosen maximum error, the processing of that TOKEN is terminated, and an error message is sent to the Participant to try again. The Backend 2410 extract-and-expands [ss; Par↔Back] at 2440 into [key; Par→Back], [key; Back→Par], [key; Par→Back]$_H$, $m_1$, $m_2$. $m_1$, $m_2$ are used for updating of the private keys b and bb. This results in updates of $b_1$, $b_2$, $bb_1$ and $bb_2$ without affecting the aforementioned collective access to the secrets associated with the Backend 2410, in particular the Pohlig-Hellman collectively accessible secret $bb_1bb_2$ mod n. [key; Par→Back]$_H$ is used to update the internal HMAC key within the Backend 2410. Both partitions generate the new internal HMAC keys: h-key$_{new}$=HMAC$_{[key; Par \to Back]H}$(h-key$_{old}$). Partition 1 calculates $b^*_1 \equiv m_1b_1$ mod n and $bb^*_1 \equiv m_2bb_1$ mod n. Partition 2 calculates $b^*_2 \equiv m_1^{-1}b_2$ mod n and $bb^*_2 \equiv m_2^{-1}bb_2$ mod n. Partition 1 and partition 2 (soft) update at the same time so as to keep the modulo n products of private keys invariant: Partition 1—$b_1 \to b^*_1$; $bb_1 \to bb^*_1$; and Partition 2—$b_2 \to b^*_2$; $bb_2 \to bb^*_2$. The Backend 2410 decrypts at 2450 using the [key; Par→Back] by performing $Dec_{[key; Par \to Back]; IV}$ $(Enc_{[key; Par \to Back]; IV}(I))$ to recover I. The Backend 2410 performs their Pohlig-Hellman at 2460. First, they must perform public key validation by checking that I is on the elliptic curve. Backend 2410 now runsRSSD[bb; I; 2] to produce $I^*=bb_1bb_2I$. If an error occurs during the first pass of the algorithm, this may mean it is because the HMAC-tag was rejected. If this is true, reverse all operations done in the soft update section and do the Diffie-Hellman again. If an error occurs during the second pass, restart the Pohlig-Hellman (this run of the algorithm). The Backend 2410 now runs a Key Confirmation at 2470. To do this, it must extract-and-expand an HMAC key from I* for the Key Confirmation and IV generation: K. Backend 2410 generates the one-time use Key Confirmation HMAC key: h-key$_{conf}$=HMAC$_K$(h-key$_{new}$∥$r_1r_2$∥01), where $r_1r_2$I is computable (by partition 1 using $r_1$ and partition 2 using $r_2$) from $r_2$I and $r_1$I that are exchanged during the RSSD process used for the Pohlig-Hellman, i.e., RSSD[bb; I; 2]. Generate IV'=HMAC$_K$(h-key$_{new}$∥$r_1r_2$I$\mu$10). Truncate IV' to the desired number of bits to form the actual IV used. The partitions at the Backend 2410 will run a Key Confirmation procedure over the transcript of the last successful Diffie-Hellman and the last successful Pohlig-Hellman from above. If the Key Confirmation is rejected, restart the Pohlig-Hellman algorithm. Once this is confirmed, make the soft updates of 2440 a hard change. The Backend 2410 now encrypts (I*) at 2480 with AES-GCM using [key; Back→Par] for the key and the newly generated IV. The Backend 2410 sends Package$_{Back \to Par}$=($Enc_{[key; Back \to Par]; IV}(I^*)$; IV) to the Participant 2510 on FIG. 25.

Figure 25:
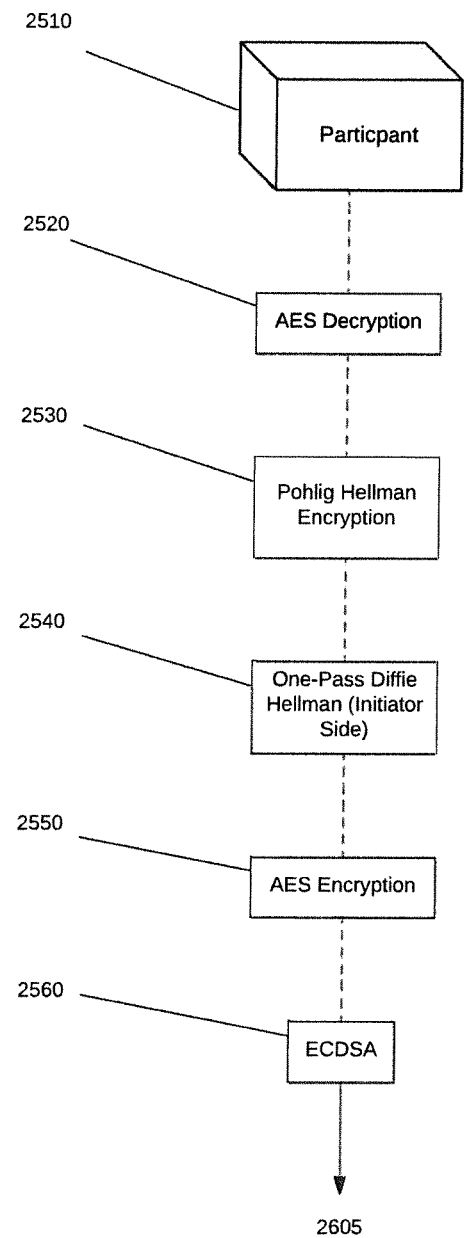
FIG. 25 comprises a flow diagram as configured in accordance with various embodiments of these teachings and that illustrates the Participant's process between processing by the Backend and the Translator. It reflects the Participant's Pohlig-Hellman decryption and the initiator's steps of the One-Pass Diffie-Hellman.

Referring now to FIG. 25, the Participant 2510 decrypts at 2520 using [key; Back→Par], the associated IV and Authentication Tag. Perform $Dec_{[key; back \to par]; IV}$ $(Enc_{[key; Back \to Par]; IV}(I^*))$ to recover I*. The Participant 2510 performs their Pohlig-Hellman at 2530. First, they must perform public key validation by checking I* is on the elliptic curve. Participant 2510 now computes $I^{**}=l^{-1}I^*=l^{-1}bb_1bb_2lP=bb_1bb_2P$. This is the Pohlig-Hellman decryption process. This result will be encrypted for the Translator. The Participant 2510 acts as the initiator in a One-Pass Diffie-Hellman at 2540. First, they generate a random integer $rand_p$ in [1, n−1] for an ephemeral private key to be used in the next step for one-pass Diffie-Hellman computation. Participant 2510 now multiplies the Translator's Diffie-Hellman public key T by $rand_p$ to produce $rand_pT=rand_pt_1t_2G$, which is the one-pass Diffie-Hellman shared secret [ss; Par↔Trans]. Participant 2510 now multiplies G by $rand_p$ to produce $rand_pG$ which is the public key [pk; Par↔Trans] used for the one-pass Diffie-Hellman. This will be communicated to the Translator to enable the Translator to compute the shared secret. The Participant 2510 encrypts at 2550 using the [ss; Par↔Trans]. They extract-and-expand on [ss; Par↔Trans] into [key; Par→Trans] and [key; Trans→Par]. Encrypt I with AES-GCM mode using [key; Par→Trans] for the key. The [key; Back→Par] key is used to decrypt the material from the Translator when it returns information. The IV for the AES-GCM mode is randomly generated for use in encryption and transmitted for use in decryption by the Translator. Store pre—TOKEN=($Enc_{[key; Par \to Trans]; IV}$(I); [pk; Par↔Trans]; IV) in the Participant database to be used whenever the Enc_TOKEN needs to be updated. [ss; Par↔Trans], [key; Par→Trans] and ephemeral private key $rand_p$ should be discarded (so as not to enable local exposure of Participant-invariant intermediate TOKEN value I). The Participant 2510 signs $Package_{Par \to Trans}=$ $(Enc_{[key; Par \to Trans]; IV}$(I); [pk; Par↔Trans]; IV) at 2560 using their ECDSA signature generation private key to produce $Sig_{Par \to Trans}$. The Participant 2510 sends (Package$_{Par \to Trans}$; $Sig_{Par \to Trans}$) to the Translator 2605 on FIG. 26.

Figure 26:
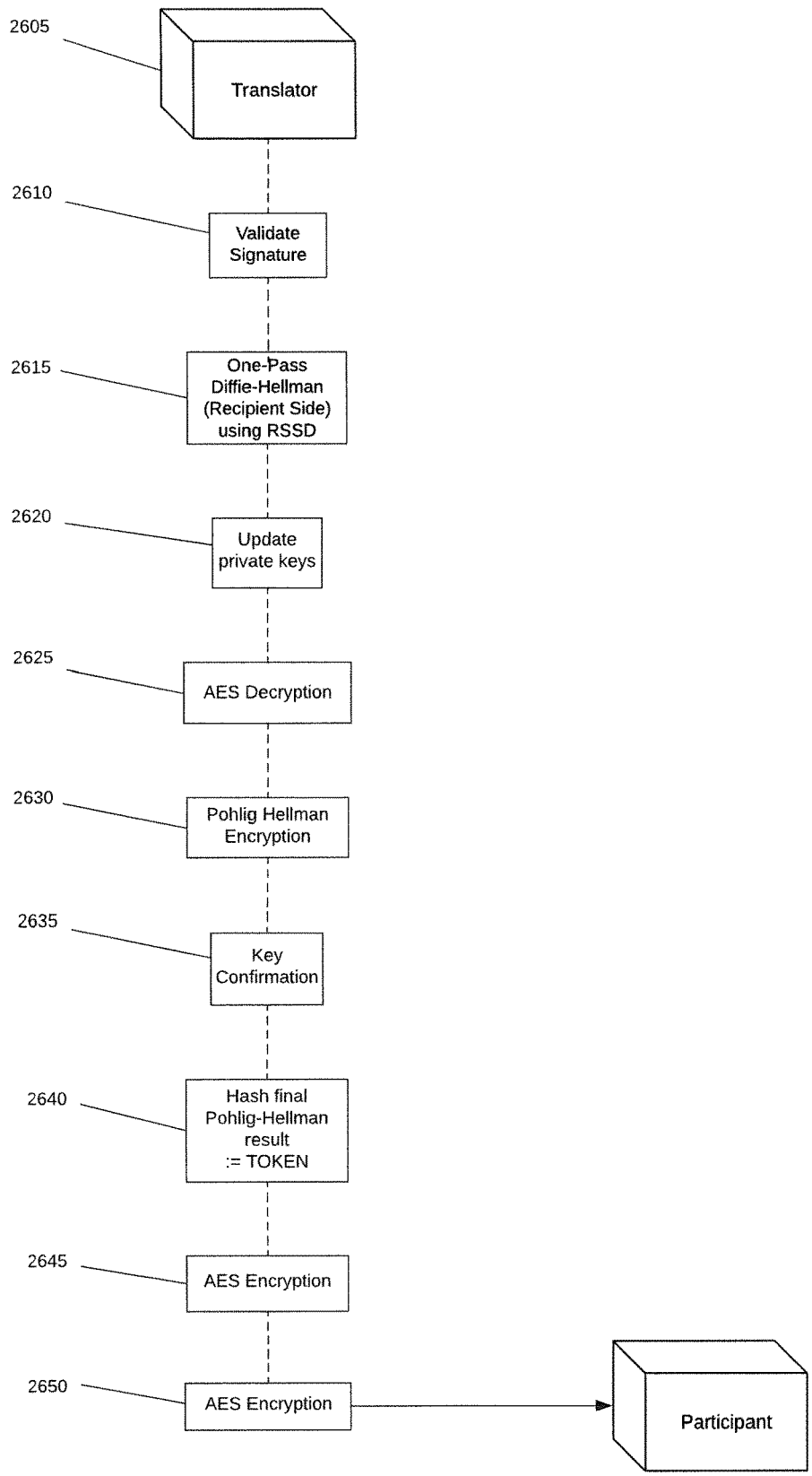
FIG. 26 comprises a flow diagram as configured in accordance with various embodiments of these teachings and that illustrates the Translator's role in the tokenization process. This includes the recipient's side of the One-Pass Diffie-Hellman and the Translator's part of the Pohlig-Hellman process. In this example, this is the final step in the creation of the TOKEN.

Referring now to FIG. 26, the Translator 2605 verifies that $Sig_{Par \to Trans}$ is a valid signature at 2610. The Translator 2605 acts as the recipient in a One-Pass Diffie-Hellman at 2615. First, they perform public key validation by checking that $rand_pG$ is on the elliptic curve. The Translator 2605 now runs RSSD[t; $rand_pG$; 2] to recover $rand_pT=rand_pt_1t_2G$ which is the shared secret ss; [Par↔Trans] for use in one-pass Diffie-Hellman. If a detectable error occurs during this algorithm, restart this algorithm. Anytime persistent errors in the Backend and Translator occur for more than a chosen maximum error, the processing of that TOKEN is terminated, and an error message is sent to the Participant to try again. The Translator 2605 extract-and-expands [ss; Par↔Trans] at 2620 into [key; Par→Trans], [key; Trans→Par], [key; Par→Trans]$_H$, $m_1$, $m_2$. $m_1$ and $m_2$ are used for updating of the private keys t and tt. [key; Par→Trans]$_H$ is used to update the internal HMAC key within the Translator 2605. Both partitions generate the new internal HMAC keys: h-key$_{new}$=HMAC$_{[key; Par \to Tran]du H}$ (h-key$_{old}$). Partition 1 calculates $t^*_1 \equiv m_1 t_1$ mod n and $tt^*_1 \equiv m_2 tt_1$ mod n. Partition 2 calculates $t^*_2 \equiv m_1^{-1} t_2$ mod n and $tt^*_2 \equiv m_2^{-1} tt_2$ mod n. Partition 1 and partition 2 (soft) update at the same time so as to keep the modulo n products of private keys invariant: Partition 1—$t_1 \to t_1^*$; $tt_1 \to tt_1^*$; and Partition 2—$t_2 \to t^*_2$; $tt_2 \to tt^*_2$. The Translator 2605 decrypts at 2625 using the [key; Par→Trans] by performing Dec$_{[key; Par \to Trans]; IV}$(Enc$_{[key; Par \to Trans]; IV}$(I)) to recover I. The Translator 2605 performs their Pohlig-Hellman at 2630. First, they must perform public key validation by checking I is on the elliptic curve. Translator 2605 now runs RSSD[tt; I; 2] to produce the Pohlig-Hellman ciphertext: $tt_1 tt_2 I^{}=tt_1 tt_2 bb_1 bb_2 P$. If an error occurs during the first pass of the algorithm, this may mean it is because the HMAC-tag was rejected. If this is true, reverse all operations done in the soft update section and do the Diffie-Hellman again. If an error occurs during the second pass, restart the Pohlig-Hellman (this run of the algorithm). The Translator 2605 now runs a Key Confirmation at 2635. To do this, it must extract-and-expand an HMAC key from $tt_1 tt_2 bb_1 bb_2 P$ for the Key Confirmation and IV generation: K. Translator 2605 generates the one-time use Key Confirmation HMAC key: h-key$_{conf}$=HMAC$_K$(h-key$_{new}$||$r_1 r_2 I^{}$||01) where $r_1 r_2 I^{}$ is computable from the RSSD process used for the Pohlig-Hellman. Generate $IV_1'$=HMAC$_K$(h-key$_{new}$||$r_1 r_2 I^{}$||10). Truncate $IV_1'$ to the desired number of bits to form the actual $IV_1$ used. Generate $IV_2'$=HMAC$_K$(h-key$_{new}$||$r_1 r_2 I^{**}$||11). Truncate $IV_2'$ to the desired number of bits to form the actual $IV_2$ used. The partitions of the Translator 2605 will run a Key Confirmation procedure over the transcript of the last successful Diffie-Hellman and the last successful Pohlig-Hellman from above. If the Key Confirmation is rejected, restart the Pohlig-Hellman algorithm. Once this is confirmed, make the soft updates of 2620 a hard change. Finally, Translator 2605 performs a hash at 2640 where the hash function is applied to a bit-string derived from the elliptic curve point: TOKEN=Hash($tt_1 tt_2 bb_1 bb_2 P$). The Translator 2605 encrypts the TOKEN at 2645 with AES-GCM mode using the symmetric key that is shared with the Coordinator, C, and using $IV_1$: Enc_TOKEN=(Enc$_{C; IV_1}$, (TOKEN); $IV_1$). Note that C is preferably changed out at least every $2^{32}$ uses. The Translator 2605 now encrypts Enc_TOKEN at 2650 with AES-GCM using [key; Trans→Par] and $IV_2$: Package$_{Trans \to Par}$=(Enc$_{[key; Trans \to Par]; IV_2}$ (Enc_TOKEN); $IV_2$). This is sent to the Participant. The Participant performs decryption to recover Enc_TOKEN. This is stored in the Participant's database and is submitted to the Coordinator as coordinating network element whenever they want to involve the TOKEN in a transaction or request. With regard to Enc_TOKEN relative to previously mentioned figures: The Participant receives Enc_TOKEN from the Translator (encrypted using the symmetric key from extract-and-expand of ECDH shared secret) as depicted in FIG. 13 at 1345; Enc_TOKEN corresponds to g(TOKEN) in FIG. 5 and FIGS. 7 at 515 and 715, respectively.

With regard to a Participant performing a batched request for TOKENs, the procedures depicted in FIG. 23, FIG. 24, FIG. 25 and FIG. 26 can be performed in the following manner:

The Participant runs through 2320 in FIG. 23 for each INFO it wants to process in order to create points representative of each INFO. The Participant does their Pohlig-Hellman Cipher as in FIG. 23 at 2330 to every point P, using the same randomly chosen l every time. The Participant runs through the process outlined in FIG. 23 at 2340, 2350, 2360. One Diffie-Hellman shared secret is created and used to encrypt the whole batch of I's together. The encrypted batch is signed and sent to the Backend. The Backend runs through the process outlined in FIG. 24 at 2420, 2430, 2440, 2450. The decrypted batch is a list of I's. The Backend runs through Public Key Validation for every 1 as outlined in FIG. 24 at 2460. The Backend proceeds to the Pohlig-Hellman process. When batching, RSSD for the Pohlig-Hellman in FIG. 24 at 2460 is run as follows: (1) The randomly chosen $r_i$ in each partition is used for the entire run of RSSD. (2) The entire batch is run through during each pass and sent to the counterpart partition all together. (3) The result: for every given I, there is a produced I*. The Key Confirmation outlined in FIG. 24 at 2470 is done over the entire list of I*'s. The Backend encrypts the batch with the encryption key derived from the shared secret as outlined in FIG. 24 at 2480. The Participant decrypts the batch as in FIG. 25 at 2520. The Participant does their Public Key Validation and Pohlig-Hellman Cipher decryption as in FIG. 25 at 2530, to every I* in the batch (using the same $l^{-1}$). The Participant runs through the process outlined in FIG. 25 at 2540, 2550, 2560. One Diffie-Hellman shared secret is created and used to encrypt the whole batch of I's together. The encrypted batch is signed and sent to the Translator. This encrypted batch is not stored at the Participant database as the single pre-TOKEN is in FIG. 25 at 2550. The Translator runs through the process outlined in FIG. 26 at 2610, 2615, 2620, 2625. The decrypted batch is a list of I's. The Translator runs through Public Key Validation for every I as outlined in FIG. 26 at 2630. The Translator proceeds to the Pohlig-Hellman process. When batching, RSSD for the Pohlig-Hellman is run as follows: (1) The randomly chosen $r_i$ in each partition is used for the entire run of RSSD. (2) The entire batch is run through during each pass and sent to the counterpart partition all together. (3) The result: for every given I, there is produced an unhashed TOKEN. The Key Confirmation outlined in FIG. 26 at 2635 is done over the entire list of unhashed TOKENs. The Translator generates enough $IV_1$'s as in FIG. 26 at 2635 to encrypt every TOKEN with a different IV. The bits concatenated on the end of $IV_1$ used in the single TOKEN case will need to be extended to accommodate the number of TOKENs being processed. The values inserted into this bit-field must be distinct for all $IV_1$ as well as for the Key Confirmation HMAC key and $IV_2$. The Translator creates the TOKENs and Enc_TOKEN as in FIGS. 26 at 2640 and 2645, respectively, for every unhashed TOKEN. The Translator encrypts the batch for the Participant with the shared secret as outlined in FIG. 26 at 2650. The Participant decrypts the batch and stores the Enc_TOKENs in their database. The list of Enc_TOKENs in the database may be scrambled to hide the sequence in which they were acquired. Note that if the Coordinator response to a transaction processing request from a Participant indicates an Authentication Tag failure, then the Participant can either individually re-process the associated INFO or incorporate it into a future batch request. This choice may be constrained by scenario-specific implementation strategies. Such Authentication Tag failure may be due to an update of the symmetric encryption key that is shared between the Translator and the Coordinator.

More specifically by way of example with regard to key confirmation at partition 1 of the Backend in the batched case, extract-and-expand is applied using the set of I* to generate a key that is used with the sum of the $r_1 r_2 I$ elliptic curve point values to derive key confirmation key and initialization vector values. Note that partition 1 can construct this sum by first computing the sum of the $r_2 I$ elliptic curve point values it receives from partition 2 during a run of the RSSD process for Pohlig-Hellman, and then applying scalar multiplication to that intermediate sum by using its own $r_1$ value. Partition 2 performs the analogous operations.

With regard to an alternative mechanism to address entity authentication and data integrity of intra-processor (partition-to-partition) communication passes:

The following method relies on asymmetric digital signature generation and verification, and thus has higher processing cost than the symmetric use of HMAC. However, it offers the advantage that compromise of one partition within a processor pair does not leak information necessary to successfully masquerade as the other partition, in that the compromised partition does not have access to the key needed to sign as the other partition. Similarly to the way that an initial HMAC key is generated through an extract-and-expand operation on a shared secret that is established between the two partitions, such extract-and-expand can be used to additionally or instead generate an initial $priv_1$ signature generation private key to be used by partition 1 and an initial $priv_2$ key to be used by partition 2. Partition 1 generates the public key $priv_2 G$ that corresponds to $priv_2$ (namely, $pub_2$), and partition 2 generates $priv_1 G = pub_1$. Under usage of a digital signature scheme such as ECDSA, update of $priv_1$, $priv_2$, $pub_1$ and $pub_2$ occurs as follows: extract-and-expand of a computed shared secret (such as that derived from a shared secret that originates with a Participant) results in $modifier_1$ and $modifier_2$. Then $priv_{1new} = modifier_1 * priv_{1current}$ mod n, and $pub_{1new} = modifier_1 * pub_{1current}$ (and analogously for $priv_{2new}$ and $pub_{2new}$). Note that one example instantiation of this method is to continue to use HMAC for intra-processor communications as before, but to replace the Key Confirmation construction by $Sign_{priv_1}$(transcript∥Pohlig-Hellman Ciphertext) and $Sign_{priv_2}$(transcript∥Pohlig-Hellman Ciphertext), respectively. This formulation of Key Confirmation does not have a dependency on subsequent $r_1 r_2 Q$ being unavailable to an adversary who has surreptitiously compromised, say, partition 1, and thus learned the full state of partition 1's random bit generator, RBG1 (at least until RBG1 makes effective use of a Live Entropy Source that is unavailable to the adversary after having "exited" partition 1).

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method for effecting a data-based activity via a network, the method comprising:
   by a coordinating network element that manages a protocol:
   receiving, via the network and from a requesting network element comprising one of:
      a network element that is acting within an attestor role; and
      at least one secondary network element that is acting within a requestor role, a protocol-compliant request regarding data information comprising at least one of:
         at least one reference to a data content, as representative of a content of the data information;
         at least one reference to a data type;
         a reference to an entity; and
         data information associated with an entity;
   wherein the protocol prohibits the coordinating network element that manages the protocol from substantively accessing tokenized data information corresponding to a tokenization of at least part of the data information that, at least in part, underlies the protocol-compliant request;
   wherein when the requesting network element is the network element that is acting within the attestor role, the method further comprises:
   facilitating, at least in part via the protocol, as an attestor authorization operation, authorizing the requesting network element to make at least part of the tokenized data information asynchronously available for data-based processing wherein the tokenized data information is sourced via the requesting network element and wherein when, as a sourcing operation, the tokenized data information is sourced as indirect data, the sourcing operation entails derivation of the data information associated with an entity from data received by the requesting network element from the entity as an initial data source, and wherein an identity of each of the at least one secondary network element that is acting within the requestor role is blinded from the requesting network element; and
   wherein when the requesting network element is a secondary network element of the at least one secondary network element that is acting within the requestor role, the method further comprises:
   facilitating, at least in part via the protocol, as a requestor authorization operation, authorization of the secondary network element to process the tokenized data information previously sourced from another requesting network element, wherein an identity of the another requesting network element is blinded from the secondary network element.

2. The method of claim 1 wherein the data-based processing comprises at least one of:
   transference of the data content, as data content that was previously attested to, wherein successful transference is contingent on matching on one or more tokens representative of the data information associated with the entity as common to both attestor and requestor; and
   corroboration of the data content, as candidate data content, against data content that was previously attested to, wherein successful corroboration comprises matching on one or more tokens representative of the data content as common to both attestor and requestor.

3. The method of claim 2 wherein the corroboration of the data content against the data content that was previously attested to comprises, at least in part, as the sourcing operation, sourcing the tokenized data information from the requesting network element, as the secondary network element of the at least one secondary network element that is acting within the requestor role, wherein when the tokenized data information is sourced as indirect data the sourcing operation entails derivation of the data information associated with the entity from data received by the requesting network element from the entity as the initial data source.

4. The method of claim 1 wherein the protocol-compliant request comprises a plurality of discrete messages.

5. The method of claim 2 wherein the attestor authorization operation comprises, at least in part, generating verifiable permissions that advise relayers that a requesting network element acting within the attestor role is authorized, as a storage operation, to store content in relayer-accessible storage comprising at least one of cryptographic parameters, data, and metadata instrumental to enabling at least one of the transference of the data content and the corroboration of the data content.

6. The method of claim 5 wherein the storing of the content in the relayer-accessible storage, as the storage operation, comprises storing parts of the content in at least one of:
plaintext form; and
encrypted form.

7. The method of claim 5 wherein the content comprises stored values that are configured to serve as at least one of:
decryption tokens, which is used to transfer the data content, that represent at least one of ciphertext and cryptographic parameters generated by the requesting network element acting within the attestor role; and
at least one of cryptographic parameters and metadata that are applied together with data to configure comparison tokens, which is used to corroborate the data content, such that a determination is made regarding whether there is a match of comparison tokens representing candidate data processed by the requesting network element, as the secondary network element of the at least one secondary network element that is acting within the requestor role, using the stored values against comparison tokens representing a result of processing data contributed by the requesting network element acting within the attestor role.

8. The method of claim 5 wherein the content comprises a collection of shares such that a threshold number of such shares enables reconstruction of the content, and wherein the shares are distributed across a plurality of relayers by the requesting network element acting within the attestor role.

9. The method of claim 2 wherein the requestor authorization operation comprises, at least in part, generation of verifiable permissions that advise at least one relayer that the requesting network element, as the secondary network element of the at least one secondary network element that is acting within the requestor role, is authorized to retrieve from relayer-accessible storage, in plaintext or encrypted form, content comprising at least one of cryptographic parameters, data, and metadata.

10. The method of claim 1 wherein the tokenized data information comprises tokens that are generated using at least one secret which is unavailable to the coordinating network element.

11. An apparatus configured to effect a data-based activity via a network, the apparatus comprising:
a network interface;
a control circuit configured as a coordinating network element that manages a protocol by:
receiving via the network interface and from a requesting network element comprising one of:
a network element that is acting within an attestor role; and
at least one secondary network element that is acting within a requestor role; and a protocol-compliant request regarding data information comprising at least one of:
at least one reference to a data content, as representative of a content of the data information;
reference data type;
at least one reference to an entity; and
data information associated with an entity;
wherein the protocol prohibits the coordinating network element that manages the protocol from substantively accessing tokenized data information corresponding to a tokenization of at least part of the data information that, at least in part, underlies the protocol-compliant request;
wherein when the requesting network element is the network element that is acting within the attestor role, the apparatus is further configured to facilitate, at least in part via the protocol, as an attestor authorization operation, authorizing the requesting network element to make at least part of the tokenized data information asynchronously available for data-based processing wherein the tokenized data information is sourced via the requesting network element and wherein when, as a sourcing operation, the tokenized data information is sourced as indirect data, the sourcing operation entails derivation of the data information associated with an entity from data received by the requesting network element from the entity as an initial data source, and wherein an identity of each of the at least one secondary network element that is acting within the requestor role is blinded from the requesting network element; and
wherein when the requesting network element is a secondary network element of the at least one secondary network element that is acting within the requestor role, the apparatus is further configured to facilitate, at least in part via the protocol, as a requestor authorization operation, authorization of the secondary network element to process the tokenized data information previously sourced from another requesting network element, wherein an identity of the another requesting network element is blinded from the secondary network element.

12. The apparatus of claim 11 wherein the data-based processing comprises at least one of:
transference of the data content, as data content that was previously attested to, wherein successful transference is contingent on matching on one or more tokens representative of the data information associated with the entity as common to both attestor and requestor; and
corroboration of the data content, as candidate data content, against data content that was previously attested to, wherein successful corroboration comprises matching on one or more tokens representative of the data content as common to both attestor and requestor.

13. The apparatus of claim 12 wherein the corroboration of the data content against the data content that was previously attested to comprises, at least in part, as the sourcing operation, sourcing the tokenized data information from the requesting network element, as the secondary network element of the at least one secondary network element that is acting within the requestor role, wherein when the tokenized data information is sourced as indirect data the sourcing operation entails derivation of the data information associated with the entity from data received by the requesting network element from the entity as the initial data source.

14. The apparatus of claim 11 wherein the protocol-compliant request comprises a plurality of discrete messages.

15. The apparatus of claim 12 wherein the attestor authorization operation comprises, at least in part, generating verifiable permissions that advise relayers that a requesting network element acting within the attestor role is authorized, as a storage operation, to store content in relayer-accessible storage comprising at least one of cryptographic parameters, data, and metadata instrumental to enabling at least one of the transference of the data content and the corroboration of the data content.

16. The apparatus of claim 15 wherein the storing of the content in the relayer-accessible storage, as the storage operation, comprises storing parts of the content in at least one of:
  plaintext form; and
  encrypted form.

17. The apparatus of claim 15 wherein the content comprises stored values that are configured to serve as at least one of:
  decryption tokens, which is used to transfer the data content, that represent at least one of ciphertext and cryptographic parameters generated by the requesting network element acting within the attestor role; and
  at least one of cryptographic parameters and metadata that are applied together with data to configure comparison tokens, which is used to corroborate the data content, such that a determination is made regarding whether there is a match of comparison tokens representing candidate data processed by the requesting network element, as the secondary network element of the at least one secondary network element that is acting within the requestor role, using the stored values against comparison tokens representing a result of processing data contributed by the requesting network element acting within the attestor role.

18. The apparatus of claim 15 wherein the content comprises a collection of shares such that a threshold number of such shares enables reconstruction of the content, and wherein the shares are distributed across a plurality of relayers by the requesting network element acting within the attestor role.

19. The apparatus of claim 12 wherein the requestor authorization operation comprises, at least in part, generation of verifiable permissions that advise at least one relayer that the requesting network element, as the secondary network element of the at least one secondary network element that is acting within the requestor role is authorized to retrieve from relayer-accessible storage, in plaintext or encrypted form, content comprising at least one of cryptographic parameters, data, and metadata.

20. The apparatus of claim 11 wherein the tokenized data information comprises tokens that are generated using at least one secret which is unavailable to the coordinating network element.

* * * * *